（12） United States Patent
Hong

(10) Patent No.: US 11,843,446 B2
(45) Date of Patent: Dec. 12, 2023

(54) METHOD AND DEVICE OF CONTROLLING UNMANNED AERIAL VEHICLE TO ACCESS NETWORK

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 534 days.

(21) Appl. No.: 17/055,938

(22) PCT Filed: May 17, 2018

(86) PCT No.: PCT/CN2018/087389
§ 371 (c)(1),
(2) Date: Nov. 16, 2020

(87) PCT Pub. No.: WO2019/218325
PCT Pub. Date: Nov. 21, 2019

(65) Prior Publication Data
US 2021/0211185 A1 Jul. 8, 2021

(51) Int. Cl.
*H04B 7/185* (2006.01)
*B64C 39/02* (2023.01)
(Continued)

(52) U.S. Cl.
CPC ....... *H04B 7/18506* (2013.01); *B64C 39/024* (2013.01); *G05D 1/0022* (2013.01);
(Continued)

(58) Field of Classification Search
CPC .............. H04B 7/18506; B64C 39/024; G05D 1/0022; H04W 48/16
(Continued)

(56) References Cited

U.S. PATENT DOCUMENTS

| 9,927,807 B1 | 3/2018 | Ganjoo |
| 2010/0087980 A1 | 4/2010 | Spura |

(Continued)

FOREIGN PATENT DOCUMENTS

| CN | 102749847 A | 10/2012 |
| CN | 105278544 A | 1/2016 |

(Continued)

OTHER PUBLICATIONS

European Patent Office, Extended European Search Report issued in EP Application No. 18919187.7 dated May 10, 2021, (8p).

(Continued)

*Primary Examiner* — Temica M Beamer
(74) *Attorney, Agent, or Firm* — Arch & Lake LLP

(57) ABSTRACT

A method of controlling an unmanned aerial vehicle (UAV) to access a network, applicable to a UAV control terminal, and comprising: acquiring, through a first communication circuit, information to be transmitted between the UAV and a mobile communication network; forwarding, to a second communication circuit, the information to be transmitted; and transmitting, through the second communication circuit, the information to be transmitted to an information receiving end comprising the UAV or a target base station of the mobile communication network; wherein the first communication circuit and the second communication circuit are of different types comprising a cellular communication circuit and a wireless local area network (WLAN) communication circuit. A UAV control terminal and a base station are further provided.

18 Claims, 12 Drawing Sheets

(51) Int. Cl.
    *G05D 1/00*     (2006.01)
    *H04W 48/16*     (2009.01)
    *B64U 10/13*     (2023.01)

(52) U.S. Cl.
    CPC ............ *H04W 48/16* (2013.01); *B64U 10/13* (2023.01); *B64U 2201/20* (2023.01)

(58) Field of Classification Search
    USPC ....................................................... 370/316
    See application file for complete search history.

(56) References Cited

U.S. PATENT DOCUMENTS

| | | | |
|---|---|---|---|
| 2014/0316616 A1* | 10/2014 | Kugelmass | G05D 1/104 701/8 |
| 2016/0189549 A1* | 6/2016 | Marcus | G08G 5/0091 701/3 |
| 2016/0196756 A1 | 7/2016 | Prakash et al. | |
| 2016/0275801 A1 | 9/2016 | Kopardekar | |
| 2017/0069214 A1* | 3/2017 | Dupray | G08G 5/0008 |
| 2017/0086112 A1 | 3/2017 | Xue et al. | |
| 2017/0235316 A1* | 8/2017 | Shattil | H04W 4/40 701/3 |
| 2018/0068567 A1* | 3/2018 | Gong | G08G 5/0039 |
| 2018/0074486 A1 | 3/2018 | Krishnamoorthy et al. | |
| 2018/0167131 A1* | 6/2018 | Liu | B64C 39/024 |
| 2021/0065566 A1* | 3/2021 | Li | G08G 5/0082 |

FOREIGN PATENT DOCUMENTS

| | | |
|---|---|---|
| CN | 106483971 A | 3/2017 |
| CN | 106685511 A | 5/2017 |
| CN | 106716973 A | 5/2017 |
| CN | 106792547 A | 5/2017 |
| CN | 107155007 A | 9/2017 |
| CN | 107368095 A | 11/2017 |
| CN | 107734604 A | 2/2018 |
| WO | 2016161637 A1 | 10/2016 |
| WO | 2017177361 A1 | 10/2017 |

OTHER PUBLICATIONS

First Office Action and Search Report issued in Chinese Application No. 201880000681.8, dated May 7, 2020, with English translation (23p).

International Search Report issued in PCT Application No. PCT/CN2018/087389, dated Jan. 15, 2019, with English translation, (5p).

3rd Generation Partnership Project; Technical Specification Group Radio Access Network;Study on Enhanced LTE Support for Aerial Vehicles(Release 15), 3GPP TR 36.777 V1.0.0, Dec. 2017, (93p).

NTT Docomo, Inc., Ericsson, "Presentation of Specification/Report to TSG: TR36.777, Version 1.0.0 on Study on Enhanced LTE Support for Aerial Vehicles", 3GPP TSG-RAN Meeting #78,Lisbon, Portugal, Tdoc RP-172279, Dec. 18-21, 2017, (1p).

Release 15, Annex H: Field Trials Results on Mobility, 3GPP TR 36.777 V1.0.0, Dec. 2017, (57p).

Written Opinion of the International Searching Authority Issued in Application No. PCT/CN2018/087389, dated Jan. 15, 2019, (10p).

Kai Ruan, "Research on Path Planning of TD-LTE UAV System", Electronic Technology and Information Science, Mar. 15, 2018, (69p).

\* cited by examiner

METHOD AND DEVICE OF CONTROLLING UNMANNED AERIAL VEHICLE TO ACCESS NETWORK

CROSS-REFERENCE TO RELATED APPLICATIONS

The present application is the US national phase of a PCT international application under PCT/CN2018/087389, filed on May 17, 2018, the content of which is incorporated herein by reference in its entirety for all purposes.

TECHNICAL FIELD

The present disclosure relates to methods and devices of controlling an unmanned aerial vehicle to access a network.

BACKGROUND

Pilotless aircraft is also called unmanned aerial vehicle (UAV for short), and is manipulated through radio remote control equipment and a self-equipped program control device. With the rapid development of UAV technology, UAV has been widely used in various fields, such as aerial photography, agriculture, vegetation conservation, micro self-portrait, express transportation, disaster relief, observations of wildlife, surveillance of infectious diseases, surveying and mapping, news reports, power inspections, filming and etc.

In order to further expand the application scope of UAV, 3GPP has launched a project of "Enhanced LTE Support for Aerial Vehicles" project, which aims to study and standardize services that the mobile cellular network provides to meet the requirements of UAV. However, research result shows that since the current mobile cellular network primarily guarantees ground coverage, the high-altitude coverage is not good enough. If only relying on the current mobile cellular network, the requirements on a UAV which accesses the network cannot be satisfied. In addition, cellular UAVs need to be additionally provided with cellular communication circuits, leading to cost increasing of UAV.

SUMMARY

According to a first aspect of the present disclosure, there is provided a method of controlling a UAV to access a network, applicable to a UAV control terminal, and including:
  acquiring, through a first communication circuit, information to be transmitted between the UAV and a mobile communication network;
  forwarding, to the second communication circuit, the information to be transmitted; and
  transmitting, through a second communication, the information to be transmitted to an information receiving end including the UAV or a target base station of the mobile communication network;
  wherein, the first communication circuit and the second communication circuit are of different types including a cellular communication circuit and a wireless local area network (WLAN) communication circuit.

In an embodiment of the present disclosure, the method further includes:
  accessing the mobile communication network covered by the target base station through the cellular communication circuit;
  transmitting, to the target base station, a UAV identifier of the primary UAV being controlled by the UAV control terminal so that the target base station acquires an association between a terminal identifier of the control terminal and the UAV identifier;
  transmitting, through the WLAN communication circuit and to the primary UAV, a base station identifier of the target base station.

In an embodiment of the present disclosure, the method further includes:
  detecting a target UAV control terminal within a preset distance range;
  acquiring collision event prediction information through sharing flight path information of the primary UAV with the target UAV control terminal; and
  controlling the primary UAV according to the collision event prediction information.

In an embodiment of the present disclosure, sharing flight path information of the primary UAV with the target UAV control terminal is achieved through one of the following:
  using direct communication via the WLAN communication circuit; and
  using the cellular communication circuit via the target base station.

In an embodiment of the present disclosure, acquiring the collision event prediction information through sharing flight path information of the primary UAV with the target UAV control terminal includes:
  transmitting, to the target UAV control terminal, the flight path information of the primary UAV so that the target UAV control terminal determines the collision event prediction information; and
  acquiring the collision event prediction information determined by the target UAV control terminal.

In an embodiment of the present disclosure, acquiring the collision event prediction information through sharing flight path information of the primary UAV with the target UAV control terminal includes:
  transmitting a path request with a terminal identifier of the target UAV control terminal to request flight path information of a neighboring UAV;
  acquiring the flight path information of the neighboring UAV; and
  performing collision event prediction with the flight path information of the primary UAV and the flight path information of the neighboring UAV.

In an embodiment of the present disclosure, acquiring the collision event prediction information through sharing flight path information of the primary UAV with the target UAV control terminal includes:
  transmitting, to the target base station, a collision prediction request with a terminal identifier of the target UAV control terminal, so that the target base station, in response to the collision prediction request, performs collision event prediction after acquiring a flight path information of the neighboring UAV; and
  receiving, from the target base station, collision event prediction information.

In an embodiment of the present disclosure, controlling the primary UAV according to the collision event prediction information includes:
  updating, in a case that the collision event prediction information indicates that a collision event probably occurs, the flight path information of the primary UAV; and transmitting, through the WLAN communication circuit and to the primary UAV, the updated flight path information.

According to a second aspect of the present disclosure, there is provided a method of controlling a UAV to access a network, applicable to a base station, and including:

acquiring a UAV identifier of the UAV through a UAV control terminal which accesses the network, and determining an association between the UAV identifier and a terminal identifier of the UAV control terminal; and transmitting information to the UAV through the UAV control terminal according to the association.

In an embodiment of the present disclosure, the method further includes:

receiving, from the UAV control terminal, a flight path request to request to acquire a flight path information of a neighboring UAV, wherein the flight path request includes a terminal identifier of a target UAV control terminal within a preset distance range from the UAV control terminal;

acquiring the flight path information of the neighboring UAV according to the terminal identifier of the target UAV control terminal; and transmitting, to the UAV control terminal, the flight path information of the neighboring UAV, so that the UAV control terminal performs collision event prediction with the flight path information of the neighboring UAV.

In an embodiment of the present disclosure, the method further includes:

receiving, from the UAV control terminal, a collision prediction request with a terminal identifier of the target UAV control terminal to request the base station to perform UAV collision event prediction;

acquiring flight path information of the primary UAV from the UAV control terminal and flight path information of a neighboring UAV from the target UAV control terminal;

obtaining collision event prediction information by performing collision event prediction with the flight path information of the primary UAV and the flight path information of the neighboring UAV; and transmitting, to the UAV control terminal, the collision event prediction information.

According to a third aspect of the present disclosure, there is provided a device for controlling a UAV to access a network, applicable to a UAV control terminal, and including:

an information acquiring module, configured to acquire, through a first communication circuit, information to be transmitted between the UAV and the target base station;

an information forwarding module, configured to forward, to a second communication circuit, the information to be transmitted; and an information transmitter, configured to transmit, through the second communication circuit, the information to be transmitted to an information receiving end including the UAV or a target base station of a mobile communication network;

wherein the first communication circuit and the second communication circuit are of different types including a cellular communication circuit and a WLAN communication circuit.

In an embodiment of the present disclosure, the device further includes:

a network accessing module, configured to access, through the cellular communication circuit, the mobile communication network covered by the target base station;

a UAV identifier transmitter, configured to transmit, to the target base station, a UAV identifier of the primary UAV being controlled by the UAV control terminal, so that the target base station acquires an association between a terminal identifier of the control terminal and the UAV identifier; and a base station identifier transmitter, configured to transmit, through the WLAN communication circuit and to the primary UAV, a base station identifier of the target base station.

In an embodiment of the present disclosure, the device further includes:

a detector, configured to detect a target UAV control terminal within a preset distance range;

a path sharing module, configured to share flight path information of the primary UAV with the target UAV control terminal so as to acquire collision event prediction information; and a control module, configured to control the primary UAV according to the collision event prediction information.

In an embodiment of the present disclosure, the path sharing module is configured to share the flight path information of the primary UAV with the target UAV control terminal through one of the following:

using direct communication via the WLAN communication circuit; and using the cellular communication circuit via the target base station.

In an embodiment of the present disclosure, the path sharing module includes:

a path information transmitting sub-module, configured to transmit, to the target UAV control terminal, the flight path information of the primary UAV so that the target UAV control terminal determines collision event prediction information; and a prediction information acquiring sub-module, configured to acquire the collision event prediction information determined by the target UAV control terminal.

In an embodiment of the present disclosure, the path sharing module includes:

a path request sub-module, configured to transmit a path request with a terminal identifier of the target UAV control terminal to request flight path information of a neighboring UAV;

a path information acquiring sub-module, configured to acquire the flight path information of the neighboring UAV; and a collision event prediction sub-module, configured to perform collision event prediction with the flight path information of the primary UAV and the flight path information of the neighboring UAV.

In an embodiment of the present disclosure, the path sharing module includes:

a collision prediction request sub-module, configured to transmit, to the target base station, a collision prediction request with a terminal identifier of the target UAV control terminal, so that the target bases station, in response to the collision prediction request, performs collision event prediction after acquiring the flight path information of the neighboring UAV; and a prediction information receiving sub-module, configured to receive, from the target base station, the collision event prediction information.

In an embodiment of the present disclosure, the control module includes:
a path updating sub-module, configured to update, in a case that the collision event prediction information indicates that a collision event probably occurs, the flight path information of the primary UAV.
an updated information transmitting sub-module, configured to transmit, through the WLAN communication circuit and to the primary UAV, the updated flight path information.

According to a fourth aspect of the present disclosure, there is provided a device for controlling a UAV to access a network, applicable to a base station, and including:
a UAV information acquiring module, configured to acquire a UAV identifier through the UAV control terminal which accesses the network, and determine an association between the UAV identifier and a terminal identifier of the UAV control terminal; and
an information transmitter, configured to transmit information to the UAV through the UAV control terminal according to the association.

In an embodiment of the present disclosure, the device further includes:
a path request receiver, configured to receive, from the UAV control terminal, a flight path request to request to acquire flight path information of a neighboring UAV, wherein the flight path request includes a terminal identifier of a target UAV control terminal within a preset distance range from the UAV control terminal;
a first path information acquiring module, configured to acquire flight path information of the neighboring UAV according to the terminal identifier of the target UAV control terminal; and
a path information transmitter, configured to transmit, to the UAV control terminal, the flight path information of the neighboring UAV, so that the UAV control terminal perform collision event prediction with the flight path information of the neighboring UAV.

In an embodiment of the present disclosure, the device further includes:
a prediction request receiver, configured to receive, from the UAV control terminal, a collision prediction request with a terminal identifier of the target UAV control terminal to request the base station to perform UAV collision event prediction;
a second path information acquiring module, configured to acquire a flight path information of the primary UAV form the UAV control terminal and the flight path information of the neighboring UAV from the target UAV control terminal;
a collision event prediction module, configured to obtain collision event prediction information by performing collision event prediction with the flight path information of the primary UAV and the flight path information of the neighboring UAV; and
a prediction information transmitter, configured to transmit, to the UAV control terminal, the collision event prediction information.

According to a fifth aspect of the present disclosure, there is provided a non-transitory computer-readable storage medium having computer instructions stored thereon, which, in a case that the computer instructions are executed by a processor, implement the steps of any of the methods according to the first aspect.

According to a sixth aspect of the present disclosure, there is provided a non-transitory computer-readable storage medium having computer instructions stored thereon, which, in a case that the computer instructions are executed by a processor, implement the steps of any of the methods according to the second aspect.

According to a seventh aspect of the present disclosure, there is provided a UAV control terminal, including:
a processor;
a memory, configured to store instructions executable by the processor;
wherein, the processor is configured to:
acquire, through a first communication circuit, information to be transmitted between a UAV and a target base station;
forward, to a second communication circuit, the information to be transmitted; and
transmit, through the second communication circuit, the information to be transmitted to an information receiving end including the UAV or a target base station of a mobile communication network;
wherein, the first communication circuit and the second communication circuit are of different types including a cellular communication circuit and a WLAN communication circuit.

According to an eighth aspect of the present disclosure, there is provided a base station, including:
a processor;
a memory, configured to store instructions executable by processor;
wherein, the processor is configured to:
acquire a UAV identifier of a UAV through a UAV control terminal which accesses a network, and determine an association between the UAV identifier and a terminal identifier of the UAV control terminal; and
transmit information to the UAV through the UAV control terminal according to the association.

It should be understood that the above general description and the following detailed description are just exemplary and explanatory, and cannot be construed as a limit to the present disclosure.

BRIEF DESCRIPTION OF THE DRAWINGS

The drawings herein are incorporated into the specification and constitute a part of the specification, illustrate embodiments in accordance with the present disclosure, and together with the specification are used to explain the principle of the present disclosure.

DETAILED DESCRIPTION OF THE EMBODIMENTS

Here, exemplary embodiments will be described in detail, and examples thereof are illustrated in the accompanying drawings. When the following description refers to the drawings, unless otherwise indicated, the same signs in different drawings indicate the same or similar elements. The implementation manners described in the following exemplary embodiments do not represent all implementation manners consistent with the present disclosure. Rather, they are merely examples of devices and methods consistent with some aspects of the present disclosure as set forth in the appended claims.

The executing bodies involved in the present disclosure include: a UAV, a UAV control terminal, and a base station, wherein the UAV is short for Unmanned Aerial Vehicle (UAV), which is a pilotless aircraft manipulated by radio remote control equipment and self-equipped programs control device. From technical views, UAVs can be classified into: an unmanned fixed-wing aircraft, an unmanned vertical take-off and a landing aircraft, an unmanned airship, an unmanned helicopter, an unmanned multi-rotor aircraft, an unmanned parafoil aircraft, etc. The UAV control terminal is a terminal capable of controlling a UAV remotely. And it may be a traditional dedicated UAV controller or a terminal installed with a UAV control application APP such as a smartphone, a tablet computer or other user equipment (User Equipment, UE). The base station may be a base station provided with a large-scale antenna array, a sub-base station, and etc. In specific implementations, the UAV, the UAV control terminal, and the base station are independent of each other, and meanwhile they are linked to each other to jointly implement the technical solutions according to the present disclosure.

The information transmission method according to the present disclosure may be applicable to a Long Term Evolution (LTE) system, a 5G system, or a network where both an LTE system and a 5G system are deployed, and the present disclosure is not limited thereto.

Figure 1:
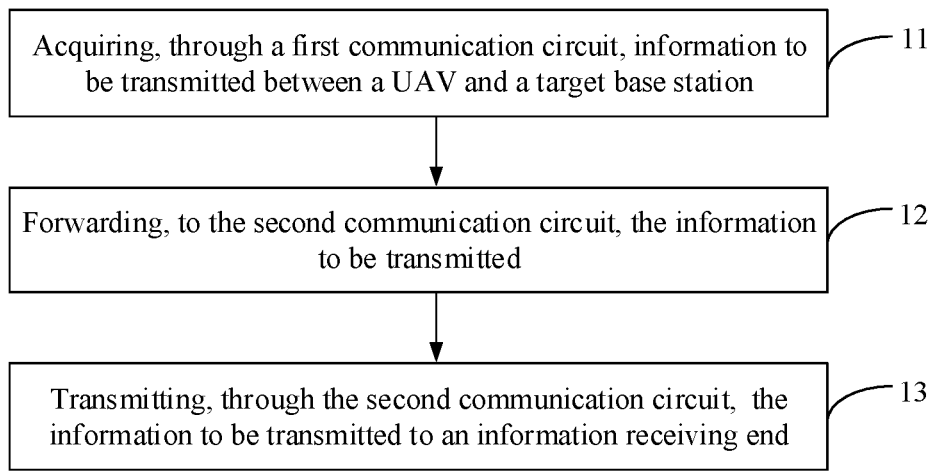
FIG. 1 is a flowchart of a method of controlling a UAV to access a network according to an exemplary embodiment of the present disclosure.

Referring to FIG. 1, a flowchart of a method of controlling a UAV to access a network is illustrated according to an exemplary embodiment. The method is applicable to a UAV control terminal, and the method may include:

In step 11, information to be transmitted between a UAV and a target base station is acquired through a first communication circuit.

In the present disclosure, the UAV is provided with a WLAN communication circuit, such as a Bluetooth communication circuit, an infrared communication circuit, a WiFi communication circuit, a ZigBee communication circuit, etc., which is capable of realizing short-range communication with the UAV control terminal.

The UAV control terminal is provided with at least two communication circuits including a WLAN communication circuit and a cellular communication circuit.

Depending on different application scenarios, the first communication circuit may be any of the foregoing communication circuits.

First application scenario: The UAV transmits information to the target base station, and the first communication circuit is a WLAN communication circuit. Through the WLAN communication circuit, the UAV first transmits, to the UAV control terminal, the information to be transmitted to the target base station. The target base station is a base station corresponding to the cell network being accessed by the UAV control terminal.

Second application scenario: The target base station transmits information to the UAV, and the first communication circuit is a cellular communication circuit. The target base station first transmits, to the cellular communication circuit of the UAV control terminal, the information to be transmitted to the UAV through the mobile communication network, that is, the cellular network.

In step 12, the information to be transmitted is forwarded to the second communication circuit.

In the present disclosure, the UAV control terminal is further provided with a second communication circuit, and the second communication circuit and the first communication circuit are of different types.

As in the above example, for the first application scenario, the second communication circuit may be a cellular communication circuit. The UAV control terminal forwards, to the cellular communication circuit, the information to be transmitted from the UAV to the cellular communication circuit, and subsequently, the cellular communication circuit transmits, to the target base station, the information to be transmitted.

For the second application scenario, the second communication circuit may be a WLAN communication circuit. The UAV control terminal can forward, to the WLAN communication circuit, the information from the target base station, and subsequently, the WLAN communication circuit transmits, to the UAV, the information to be transmitted.

In step 13, the second communication circuit transmits the information to be transmitted to an information receiving end including the UAV or a target base station of a mobile communication network.

As mentioned above, for the first application scenario, the UAV control terminal transmits through the cellular communication circuit, to the target base station, the information to be transmitted which is received from the UAV through the WLAN communication circuit.

For the second application scenario, the UAV control terminal transmits through the WLAN communication circuit, to the UAV, the information to be transmitted that is received from the target base station through the cellular communication circuit.

It can be seen that, in the method of controlling the UAV to access the mobile communication network according to the present disclosure, through the UAV control terminal provided with the cellular communication circuit, access of the UAV to the mobile communication network can be achieved and information transmission between the UAV and the target base station can be performed, and it is not required to provide additional cellular communication circuit to the UAV. Information is forwarded through the WLAN communication circuit, which can also make up the insufficient high altitude coverage of the mobile cellular network signal.

Figure 2:
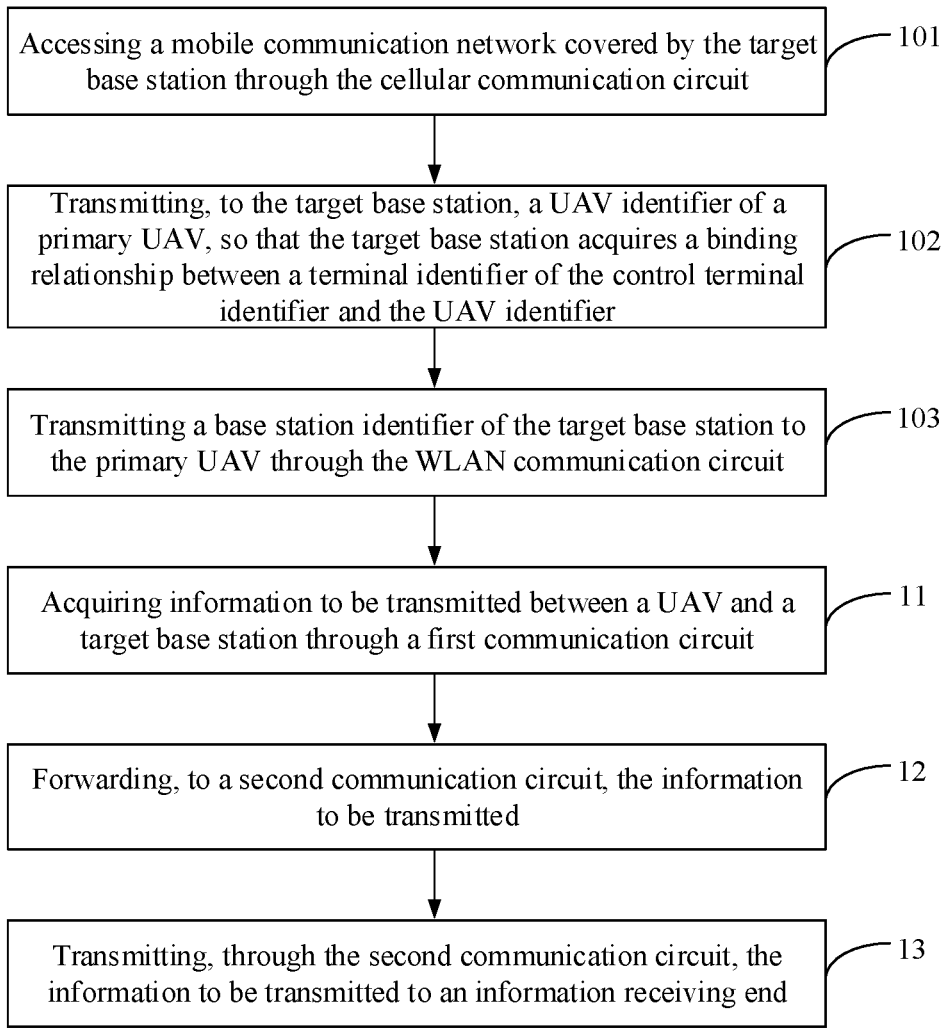
FIG. 2 is a flowchart of a method of controlling a UAV to access a network according to another exemplary embodiment of the present disclosure.

Referring to FIG. 2, which is a flowchart of a method of controlling a UAV to access a network according to another exemplary embodiment, based on the example illustrated in FIG. 1, before step 11, the method may further include:

In step 101, a mobile communication network covered by the target base station is accessed through the cellular communication circuit.

In the present disclosure, when the UAV needs to access the network, or after the UAV control terminal moves to a cell covered by a base station, a network access request to access the current cell is transmitted to a target base station covering the current cell through the cellular communication circuit.

In step 102, a UAV identifier of a primary UAV being controlled by the UAV control terminal is transmitted to the target base station, so that the target base station acquires an association (or referred to as "binding relationship") between a terminal identifier of the control terminal and the UAV identifier.

After successfully accessing the cell covered by the target base station, the UAV control terminal transmits, to the target base station, the UAV identifier of the primary UAV which is assumed to be UAV U1, wherein the UAV identifier may be information stored in the UAV control terminal in advance, or may be acquired by the UAV control terminal from the UAV through the WLAN communication circuit in real time. After acquiring the UAV identifier, the target base station can establish an association between the UAV identifier and the terminal identifier of the UAV control terminal. Assuming that the UAV control terminal is a smartphone A, the association as mentioned above can be as illustrated in Table I:

TABLE I

| Terminal Identifier of Control Terminal | UAV Identifier |
|---|---|
| Smartphone A | U1 |

In step 103, a base station identifier of the target base station is transmitted to the primary UAV through the WLAN communication circuit.

Figure 3:
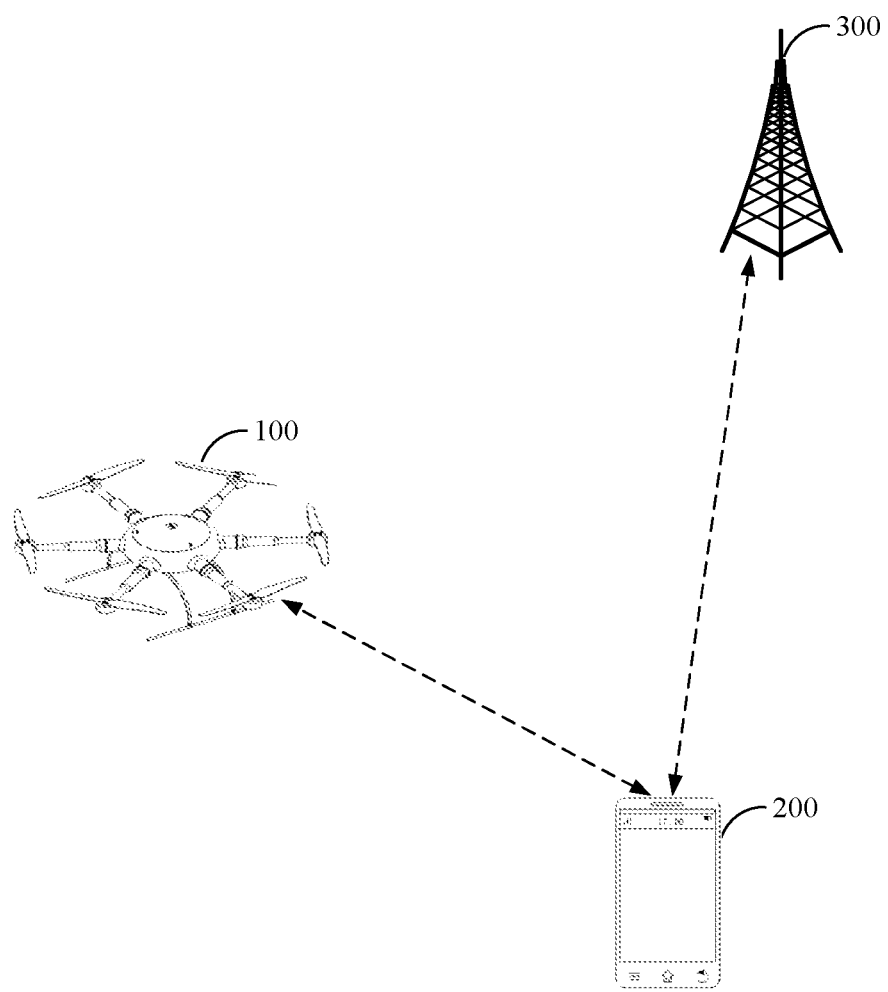
FIG. 3 is a schematic diagram illustrating an application scenario for controlling a UAV to access a network according to an exemplary embodiment of the present disclosure.

And meanwhile, the control terminal such as the smartphone A can further transmit, through the WLAN module and to the primary UAV, the base station identifier of the target base station, so that the UAV can transmit information to the target base station. In the present disclosure, the primary UAV refers to a UAV that can be being controlled by the UAV control terminal. Referring to FIG. 3, which illustrates a schematic diagram of a scenario of controlling a UAV to access a network according to an exemplary embodiment, a UAV control terminal such as a smartphone 200 can be equipped with a UAV APP, and is provided with a WLAN communication circuit and a cellular communication circuit. The smartphone 200 communicates with the target base station 300 via a mobile cellular network through the cellular communication circuit; and the smartphone 200 transmits information to the UAV 100 through a WLAN communication circuit.

Figure 4:
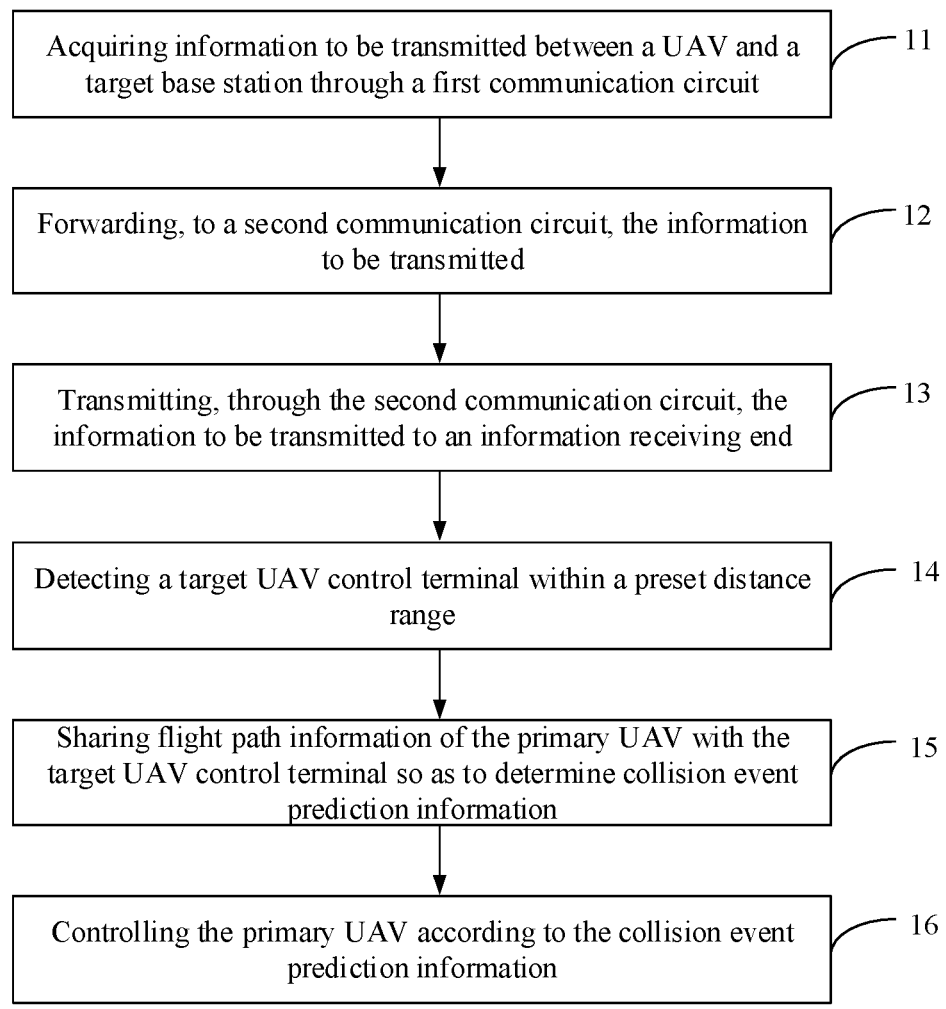
FIG. 4 is a flowchart of a method of controlling a UAV to access a network according to another exemplary embodiment of the present disclosure.

Referring to FIG. 4, which is a flowchart of a method of controlling a UAV to access a network according to another exemplary embodiment, based on the embodiment illustrated in FIG. 1, the method may further include:

In step 14, a target UAV control terminal is detected within a preset distance range.

In the present disclosure, when achieving information interaction between the UAV and the target base station through the cellular communication circuit and the WLAN communication circuit, the UAV control terminal can further detect whether there is additional UAV control terminal within the preset distance range, so as to determine whether there are other UAVs flying nearby.

Exemplarily, taking the UAV control terminal being the smartphone A as an example, through related technologies, the smartphone A can detect whether there is additional UAV control terminal within a predetermined distance range such as a radius of 500 meters. If yes, the UAV control terminal determines information on the additional UAV control terminal, such as a terminal identifier of the additional UAV control terminal. Hereinafter, the additional UAV control terminal is referred to as a target UAV control terminal.

Figure 5:
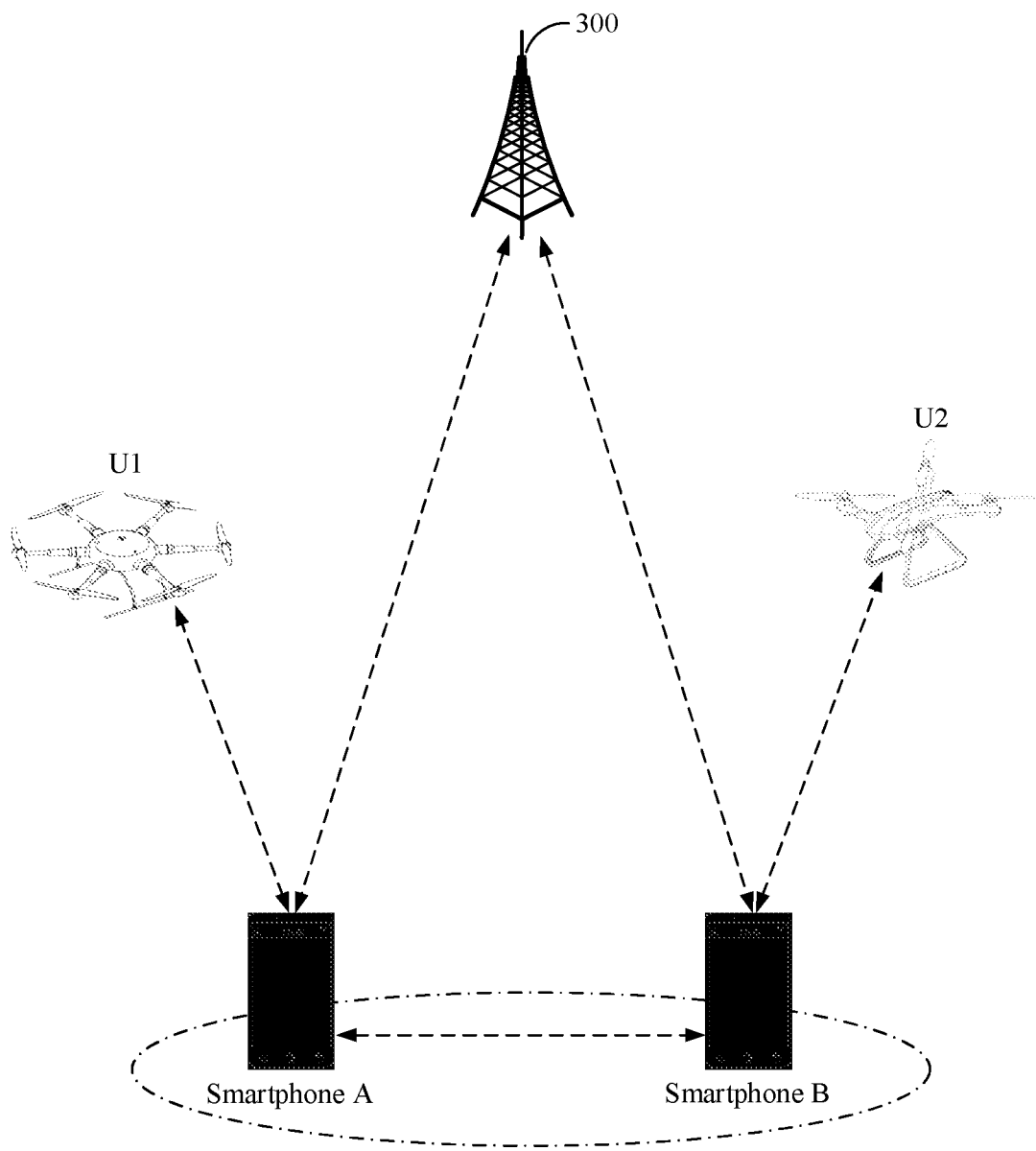
FIG. 5 is a schematic diagram illustrating an application scenario of controlling a UAV to access a network according to another exemplary embodiment of the present disclosure.

Referring to FIG. 5, which illustrates a scenario diagram of controlling a UAV to access the network according to another exemplary embodiment, the smartphone A, which controls the UAV U1, detects a target UAV control terminal, i.e., a smartphone B, within a preset distance range. The smartphone B is a control terminal for a UAV U2. And both the smartphone A and the smartphone B can access a target base station 300 through a cellular communication circuit.

In step 15, flight path information of the primary UAV is shared with the target UAV control terminal so as to acquire collision event prediction information.

In the present disclosure, after detecting a target UAV control terminal such as a smartphone B within a preset distance range, the UAV control terminal such as the smartphone A may share the flight path information of the primary UAV with the target UAV control terminal so as to acquire the collision event prediction information through at least one manner of the following:

Manner 1: The smartphone A actively shares the flight path information of UAV U1 with the smartphone B so that the smartphone B can determine the collision event prediction information.

Figure 6:
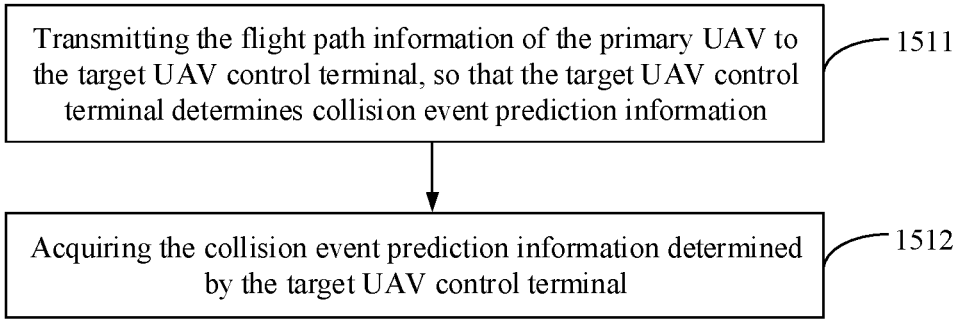
FIG. 6 is a flowchart of a method of controlling a UAV to access a network according to an exemplary embodiment of the present disclosure.

Referring to FIG. 6, which illustrates a flowchart of a method of controlling a UAV to access a network according to another exemplary embodiment, the step 15 may include:

In step 1511, the flight path information of the primary UAV is transmitted to the target UAV control terminal, so that the target UAV control terminal determines collision event prediction information;

As in the above example, assuming that a primary UAV associated with the smartphone A is UAV U1; a primary UAV associated with the smartphone B is UAV U2, then the smartphone A can transmit, to the smartphone B, flight path information of the UAV U1 through direct connection technologies such as Bluetooth communication technology, WiFi Direct or D2D (Device-to-Device, inter-devices) communication and other technologies. Or, when both the smartphone A and the smartphone B are linked to the target base station, the flight path information of the UAV U1 is transmitted to the smartphone B through the target base station, and the smartphone B is requested to compare the flight path of the UAV U1 and the flight path of the UAV U2 so as to determine whether the UAV U1 may collide with the UAV U2.

In step 1512, the collision event prediction information determined by the target UAV control terminal is acquired.

In an embodiment of the present disclosure, in a case that the smartphone B predicts that a collision event may occur through comparing the flight path information of UAV U1 with the flight path information of UAV U2, collision event prediction information may be generated and transmitted to the smartphone A. Then, the smartphone A receives the collision event prediction information from the target UAV control terminal, namely the smartphone B, so as to update the flight path of the UAV U1, or is informed of that the smartphone B plans to update the flight path of the UAV U2 to prevent collisions.

In another embodiment of the present disclosure, in a case that the smartphone B determines, through comparing the flight path information of the UAV U1 and the UAV U2, that it is impossible for the UAV U1 and the UAV U2 to collide, the smartphone B may generate a prediction information which indicates no collision, and feed the prediction information back to the smartphone A. Or, after the smartphone B determines that it is impossible for the UAV U1 and the UAV U2 to collide, the smartphone B does not feed any information back to the smartphone A. For the smartphone A, it may start timing after transmitting the flight path information of the UAV U1, and it may determine that it is impossible for the UAV U1 and the UAV U2 to collide without receiving any information from the smartphone B in a preset period of time, such as 10 minutes.

In the manner 1, the flight path information of the primary UAV is actively shared such that the target UAV control terminal predicts collision event probability in response to the flight path information of the two neighboring UAVs, thereby avoiding UAV collision event and reducing calculation amount.

Manner 2: The Smartphone A acquires flight path information of the UAV U2 and predicts the collision event.

Figure 7:
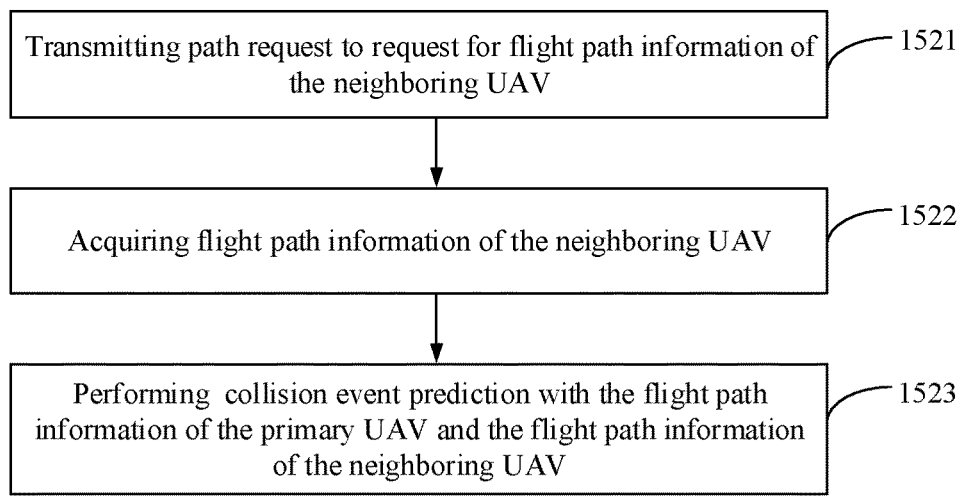
FIG. 7 is a flowchart of a method of controlling a UAV to access a network according to another exemplary embodiment of the present disclosure.

Referring to FIG. 7, which illustrates a flowchart of a method of controlling a UAV to access a network according to another exemplary embodiment, the step 15 may include:

In step 1521, a path request with a terminal identifier of a target UAV control terminal to request flight path information of the neighboring UAV is transmitted.

As in the above example, in an embodiment of the present disclosure, after the smartphone A detects the smartphone B that controls the UAV U2, it can transmit, through one of the following three manners, a path request with a terminal identifier of a control terminal to request flight path information of the UAV U2, that is, flight path information of the neighboring UAV U2.

In the first manner, the smartphone A transmits directly, to the smartphone B, the path request through the direct connection technology as mentioned above.

This manner may be applicable to a scenario where the smartphone A directly communicates with the smartphone B through a WLAN communication circuit, so that the smartphone B can transmit flight path information of the UAV U2 to the smartphone A through the direct connection technology.

In the second manner, the path request is transmitted indirectly to the smartphone B through the target base station.

This manner may be applicable to a case where an association between the smartphone B and the UAV U2 is not stored in the target base station. In such a case, the path request further includes: a terminal identifier of the target UAV control terminal, for example, a terminal identifier of the smartphone B as in the above example, so that the base station transmits the path request to the smartphone B through the mobile communication network. In the second manner, the target base station serves as an information forwarding station, and information is transmitted between the smartphone A and the smartphone B via the mobile communication network.

The third manner is to transmit, to the target base station, the path request.

In another embodiment of the present disclosure, when the smartphone A determines that the smartphone B accesses to the same target base station as the smartphone A, it can further transmit, to the target base station, the path request through the cellular communication circuit. In such a case, similar to the second manner, the path request further includes a terminal identifier of the smartphone B, such that the target base station acquires flight path information of the UAV U2 according to the terminal identifier of the smartphone B.

In step 1522, flight path information of the neighboring UAV is acquired.

Corresponding to the three manners of step 1521, step 1522 also includes three implementation manners:

In first acquiring manner, corresponding to the first manner of step 1521, flight path information of the UAV U2 is received from the target UAV control terminal, i.e., the smartphone B, through the direction connection technology.

In second acquiring manner, corresponding to the second manner of step 1521, flight path information of the UAV U2, which is transmitted by the smartphone B via the target base station, is indirectly received.

In third acquiring manner, corresponding to the third manner of step 1521, flight path information of the UAV U2 is received from the target base station. In this manner, in a case that the flight path information of the UAV U2 is stored in the target base station, the target base station can directly transmit the locally stored flight path information of the UAV U2 to the smartphone A through the mobile communication network, thereby saving the time to acquire the flight path information of the UAV U2 from the smartphone B in real time.

In step 1523, a collision event is predicted with the flight path information of the primary UAV and the flight path information of the neighboring UAV.

As in the above example, after the smartphone A acquires the flight path information of the neighboring UAV, i.e., UAV U2, it compares the flight path information of the UAV U2 with the flight path information of the primary UAV U1, so as to predict whether it is possible for the UAV U1 and the UAV U2 to collide during the flight, wherein the flight path information includes: flight time, flight path and etc.

In another embodiment of the present disclosure, the smartphone A may further generate collision event prediction information based on a result of the collision event prediction, and transmit the collision event prediction information to the smartphone B, so that the smartphone B can update the flight path of the UAV U2 according to the collision event prediction information. Or, the smartphone B is informed of that the smartphone A has updated the flight path of the UAV U1.

Manner 3: The smartphone A requests the target base station to perform the collision event prediction.

Figure 8:
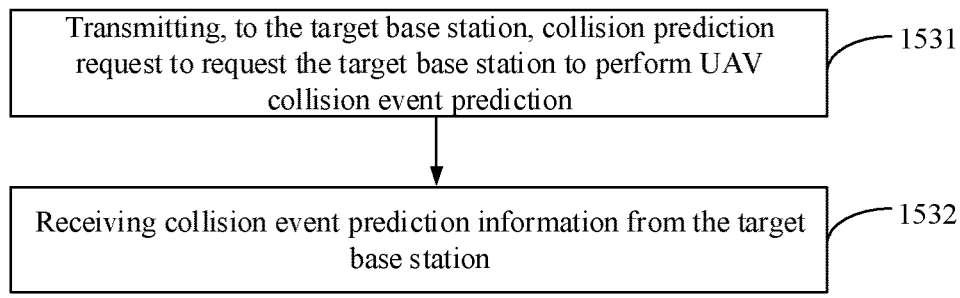
FIG. 8 is a flowchart of a method of controlling a UAV to access a network according to another exemplary embodiment of the present disclosure.

Referring to FIG. 8, which illustrates a flowchart of a method of controlling a UAV to access a network according to another exemplary embodiment, the foregoing step 15 may include:

In step 1531, a collision prediction request with a terminal identifier of the target UAV control terminal is transmitted to the target base station, so that the target base station, in response to the collision prediction request, performs collision event prediction after acquiring the flight path information of the neighboring UAV.

In the embodiment of the present disclosure, in a case that both the smartphone A and the smartphone B access the mobile communication network through the target base station, the smartphone A may transmit, to the target base station, a collision prediction request with a terminal identifier of the smartphone B, so that the target base station, in response to the collision prediction request, performs collision event prediction with the flight path information of the UAV U1 and the flight path information of the UAV U2.

In another embodiment of the present disclosure, the method further includes: transmitting, to the target base station, the flight path information of the primary UAV. This is applicable to a case that the flight path information of the primary UAV has not been transmitted to the target base station.

In step 1532, collision event prediction information is received from the target base station.

The collision event prediction information, received from the target base station through the cellular communication circuit, includes: a first indication information which indicates a potential collision or a second indication information which indicates no collision. In an embodiment of the present disclosure, a preset bit in a downlink control signaling may be intended to indicate the different indication information as mentioned above. For example, the preset bit may be set to be 1 to indicate the first indication information, and the preset bit may be set to be 0 to indicate the second indication information, thereby saving system signaling overhead.

In step 16, the primary UAV is controlled according to the collision event prediction information.

In an embodiment of the present disclosure, as described above, the collision event prediction information determined by the smartphone A may include the first indication information to indicate a potential collision. In another embodiment of the present disclosure, the first indication information may further include: detailed information of the potential collision, such as a time point or geographic information of the potential collision.

Figure 9:
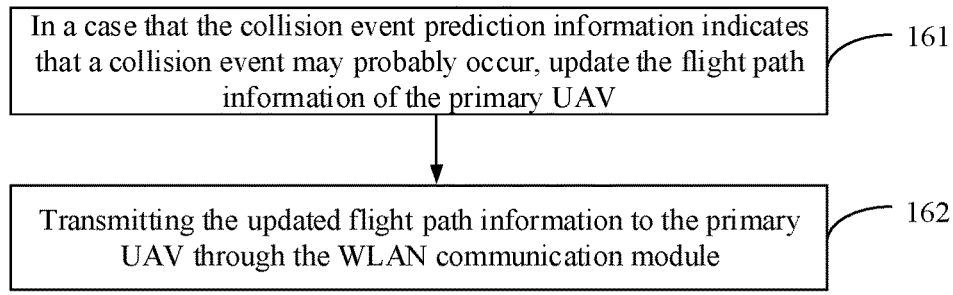
FIG. 9 is a flowchart of a method of controlling a UAV to access a network according to another exemplary embodiment of the present disclosure.

Based on this, referring to FIG. 9, which illustrates a flowchart of a method of controlling a UAV to access to a network according to another exemplary embodiment, the step 16 may include:

In step 161, in a case that the collision event prediction information indicates a potential collision event, the flight path information of the primary UAV is updated;

In step 162, the updated flight path information is transmitted to the primary UAV through the WLAN communication circuit.

In this disclosure, the UAV control terminal can update the path information of the controlled UAV in time based on the collision event prediction information, and transmit the updated flight path information to the primary UAV through the WLAN communication circuit, so as to prevent the primary UAV from colliding with the neighboring UAV, thereby guaranteeing the safe flight of the UAV.

In another embodiment of the present disclosure, in a case that the collision event prediction information includes the first indication information and the UAV control terminal is informed of that the flight path information of the neighboring UAV has been updated, or in a case that the collision event prediction information includes the second indication information, the UAV control terminal can control the UAV according to the original flight path information.

Figure 10:
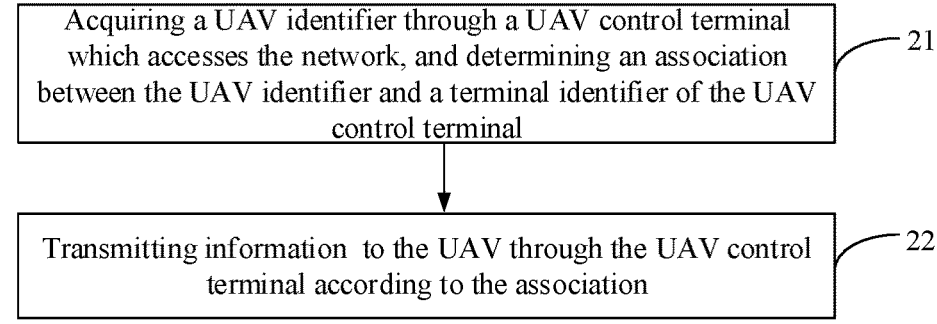
FIG. 10 is a flowchart of a method of controlling a UAV to access a network according to an exemplary embodiment of the present disclosure.

Correspondingly, the present disclosure further provides a method of controlling a UAV to access a mobile communication network, applicable to a base station. Referring to FIG. 10, which illustrates a flow chart of a method of controlling a UAV to access a network according to an exemplary embodiment of the present disclosure, the method may include the following steps:

In step 21, a UAV identifier is acquired through a UAV control terminal which accesses the network, and an association between the UAV identifier and a terminal identifier of the UAV control terminal is determined.

Corresponding to the embodiment illustrated in FIG. 2, after accessing the cell network covered by the base station, a UAV control terminal can transmit a UAV identifier of a controlled UAV (i.e., a primary UAV) to the base station through the cellular communication circuit, so that the base station saves an association between the terminal identifier of the UAV control terminal and the UAV identifier of the primary UAV, as illustrated in Table I.

In step 22, according to the association, information is transmitted to the UAV through the UAV control terminal.

After determining the aforementioned association, the base station can transmit information, such as control information, to the UAV through the UAV control terminal, and can further acquire information on the UAV through the UAV control terminal. Please refer to the application scenario diagram illustrated in FIG. 3.

In the application scenario illustrated in FIG. 5, in an embodiment, corresponding to the embodiment illustrated in FIG. 6, the base station 300 can forward, to a target UAV control terminal such as a smartphone B, a flight path information of a primary UAV U1 and a collision prediction request from a UAV control terminal such as a smartphone A, so that the smartphone B perform collision event prediction with the flight path information of the primary UAV U1 and a flight path information of the neighboring UAV U2, wherein a distance between the target UAV control terminal and the UAV control terminal is less than a preset distance threshold, such as 500 meters. In addition, the base station 300 can further transmit, to the smartphone A, the collision event prediction information obtained by the smartphone B, so that the smartphone A can control the flight path of the primary UAV U1 through the WLAN communication circuit based on the collision event prediction information so as to guarantee safe flight of the primary UAV U1.

Figure 11:
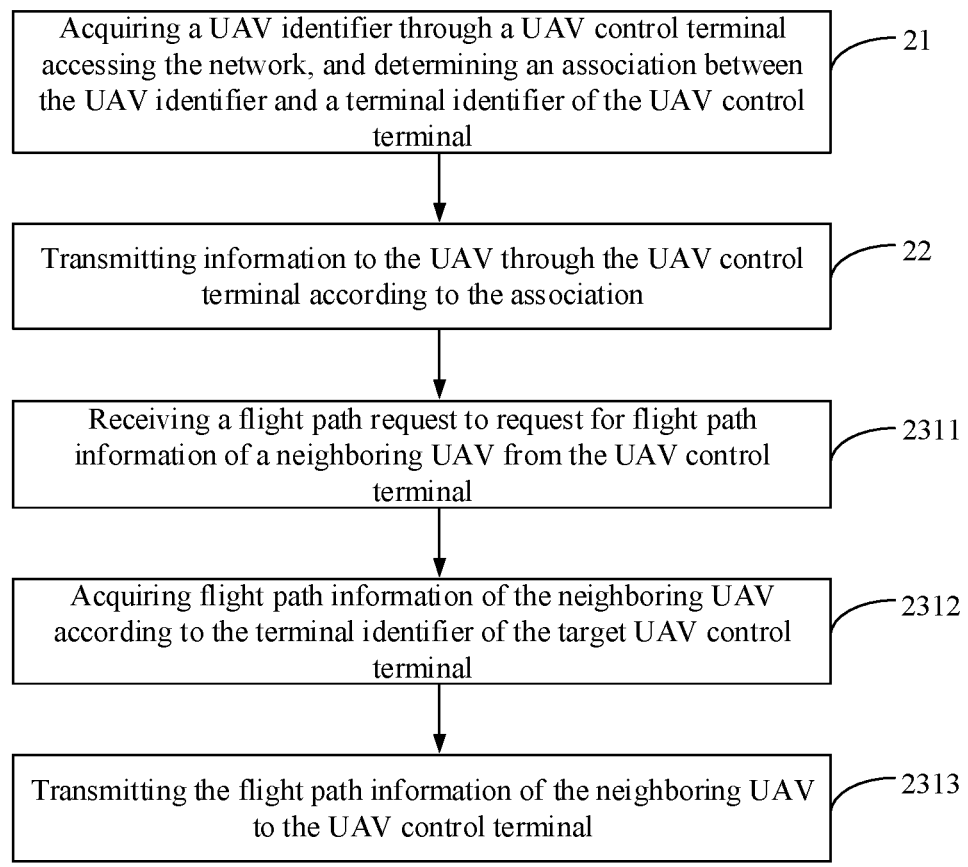
FIG. 11 is a flowchart of a method of controlling a UAV to access a network according to another exemplary embodiment of the present disclosure.

In an embodiment corresponding to the embodiment illustrated in FIG. 7, referring to FIG. 11, which illustrates a flowchart of a method of controlling a UAV access to a network according to an exemplary embodiment, the method may further include:

In step 2311, a flight path request to request flight path of a neighboring UAV is received from the UAV control terminal, wherein the flight path request includes: a terminal identifier of a target UAV control terminal within in a preset distance range from the UAV control terminal;

In step 2312, flight path information of the neighboring UAV is acquired according to the terminal identifier of the target UAV control terminal;

The implementation of the above step 2312 includes two cases:

In a first case, a preset list, which records a corresponding relationship between a terminal identifier and path of the UAV, is looked up according to the terminal identifier of the target UAV control terminal, so as to determines whether flight path information of the neighboring UAV is stored in the current base station, if yes, path information of the neighboring UAV that is stored locally is transmitted to the UAV control terminal, such as the smartphone A as illustrated in FIG. 5.

In a second case, in a case that flight path information of the neighboring UAV is not stored in the base station, a path acquiring request is transmitted to the target UAV control terminal such as the smartphone B so as to acquire the flight path information of the UAV U2 in real time and transmit the flight path information of the UAV U2 to the UAV control terminal, i.e., the smartphone A.

In step 2313, the flight path information of the neighboring UAVs is transmitted to the UAV control terminal, so that the UAV control terminal performs collision event prediction with the flight path information of the neighboring UAV.

The step 2312 corresponds to an implementation manner of the step 1522, and will not be elaborated here.

Figure 12:
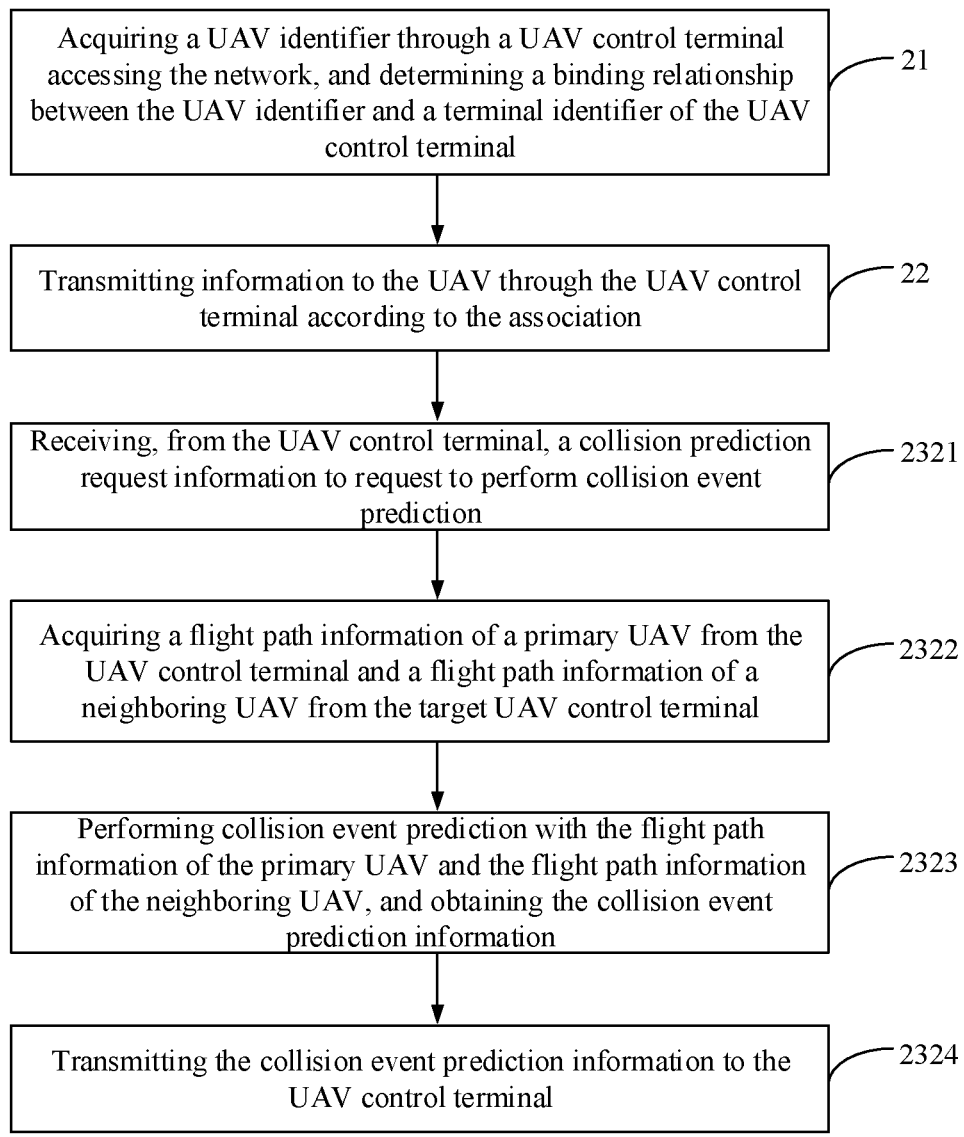
FIG. 12 is a flowchart of another method of controlling a UAV to access a network according to an exemplary embodiment of the present disclosure.

In an embodiment corresponding to the embodiment illustrated in FIG. 8, referring to the flowchart of a method of controlling a UAV to access a network according to another exemplary embodiment illustrated in FIG. 12, the method may further include:

In step 2321, a collision prediction request with the terminal identifier of the target UAV control terminal, to request the base station to predict UAV collision event, is received from the UAV control terminal;

In step 2322, a flight path information of a primary UAV is acquired from the UAV control terminal and a flight path information of a neighboring UAV is acquired from the target UAV control terminal;

Regarding the acquisition of flight path information of two neighboring UAVs, as described above, if not stored locally in the base station, they can be acquired from the UAV control terminals in real time.

In step 2323, the collision event prediction is performed with the flight path information of the primary UAV and the flight path information of the neighboring UAV, and the collision event prediction information is obtained.

After acquiring the flight path information of the primary UAV and the flight path information of the neighboring UAV, the base station can predict whether the two UAVs may collide. If a collision is likely to occur, the base station can further determine detailed information of the collision, such as estimated time of collision or estimated geographic location information of collision, and generate collision event prediction information based on the above information.

In step 2324, the collision event prediction information is transmitted to the UAV control terminal.

For the foregoing method embodiments, for the sake of simple description, they are all expressed as combination of a series of actions, but one of ordinary skill in the art should understand that the present disclosure is not limited by the described sequence of actions, as some steps can be performed in other order or simultaneously according to the present disclosure.

Secondly, those skilled in the art should also understand that the embodiments described in the specification are all optional, and the involved actions and modules are not necessarily required by the present disclosure.

Corresponding to the foregoing method embodiments, the present disclosure further provides corresponding devices and corresponding terminals embodiments.

Figure 13:
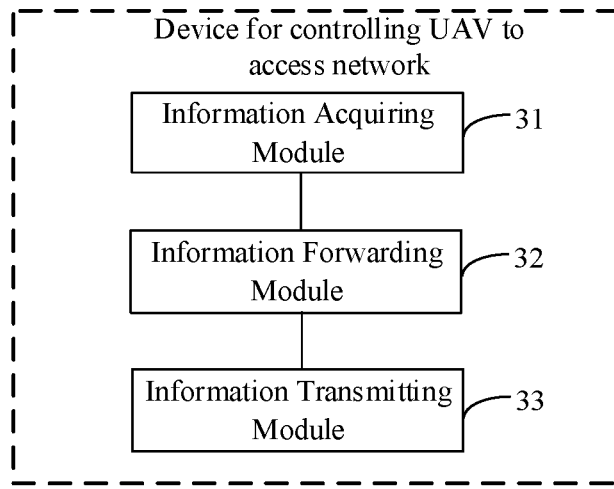
FIG. 13 is a block diagram illustrating a device for controlling a UAV to access a network according to an exemplary embodiment of the present disclosure.

Correspondingly, the present disclosure provides a device for controlling a UAV to access a network, which is provided in a UAV control terminal. Referring to FIG. 13, which is a block diagram illustrating a device of controlling a UAV to access a network according to an exemplary embodiment of the present disclosure, the device may include:

an information acquiring module 31, configured to acquire, through a first communication circuit, information to be transmitted between the UAV and the target base station;

an information forwarding module 32, configured to forward, to a second communication circuit, the information to be transmitted; and an information transmitter 33, configured to transmit, through the second communication circuit and to an information receiving end including the UAV or a target base station of a mobile communication network, the information to be transmitted;

wherein the first communication circuit and the second communication circuit are of different types including a cellular communication circuit and a WLAN communication circuit.

Figure 14:
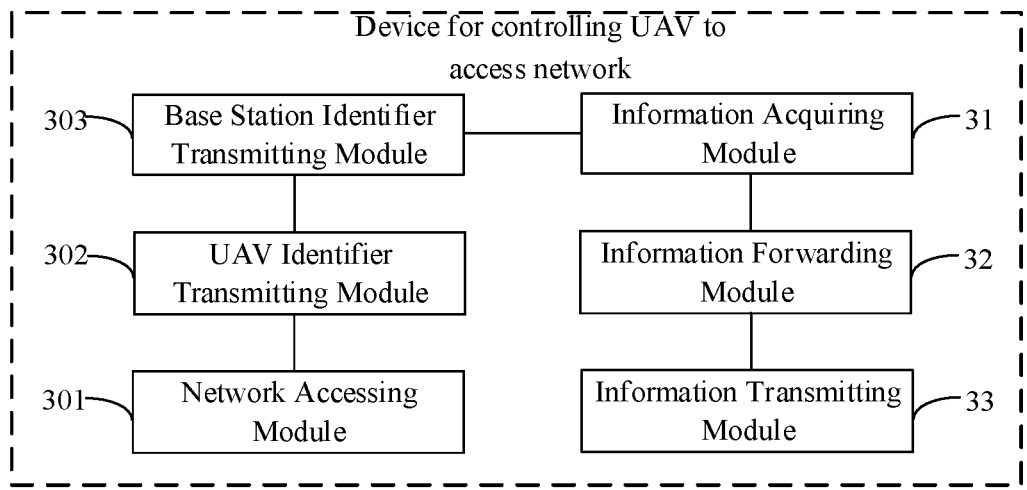
FIG. 14 is a block diagram illustrating a device for controlling a UAV to access a network according to another exemplary embodiment of the present disclosure.

Referring to FIG. 14, which illustrates a block diagram of a device for controlling a UAV to access a network according to another exemplary embodiment, based on the apparatus embodiment illustrated in FIG. 13, the device may further include:

a network accessing module 301, configured to access, through the cellular communication circuit, the mobile communication network covered by the target base station;

a UAV identifier transmitter 302, configured to transmit, to the target base station, a UAV identifier of a primary UAV being controlled by the UAV control terminal, so that the target base station acquires an association between a terminal identifier of a UAV control terminal and the UAV identifier; and a base station identifier transmitter 303, configured to transmit, through the WLAN communication circuit and to the primary UAV, a base station identifier of the target base station.

Figure 15:
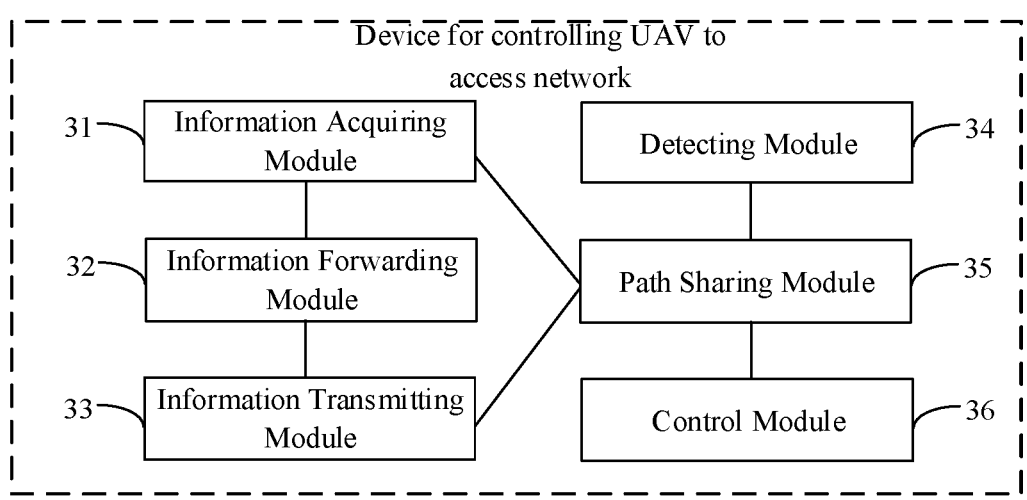
FIG. 15 is a block diagram illustrating a device for controlling a UAV to access a network according to another exemplary embodiment of the present disclosure.

Referring to FIG. 15, which illustrates a block diagram of a device for controlling a UAV to access a network according to another exemplary embodiment, based on the apparatus embodiment illustrated in FIG. 13, the device may further include:

a detector 34, configured to detect a target UAV control terminal within a preset distance range, wherein a distance between the target UAV terminal and the UAV control terminal does not exceed the preset distance range, that is, the target UAV terminal is a control terminal for a neighboring UAV;

a path sharing module 35, configured to share flight path information of the primary UAV with the target UAV control terminal so as to acquire collision event prediction information; and a control module 36, configured to control the primary UAV according to the collision event prediction information.

In the device embodiment of the present disclosure, the path sharing module 35 may share the flight path information with the target UAV control terminal through one of the following manners:

using direct communication via the WLAN communication circuit; and using the target base station via the cellular communication circuit.

Figure 16:
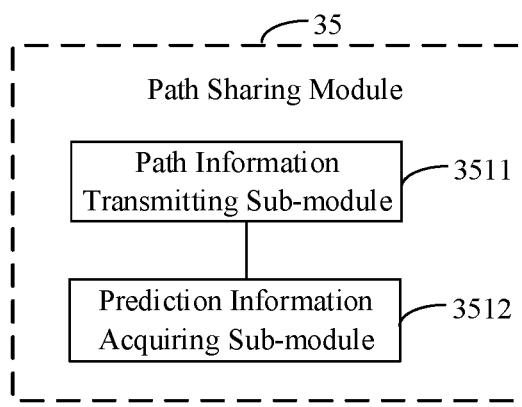
FIG. 16 is a block diagram illustrating a device for controlling a UAV to access a network according to another exemplary embodiment of the present disclosure.

Referring to FIG. 16, which illustrates a block diagram of a device for controlling a UAV to access a network according to another exemplary embodiment, based on the device embodiment illustrated in FIG. 15, the path sharing module 35 may include:

a path information transmitting sub-module 3511, configured to transmit, to the target UAV control terminal, the flight path information of the primary UAV, so that the target UAV control terminal determines collision event prediction information;

a prediction information acquiring sub-module 3512, configured to acquire the collision event prediction information determined by the target UAV control terminal.

Figure 17:
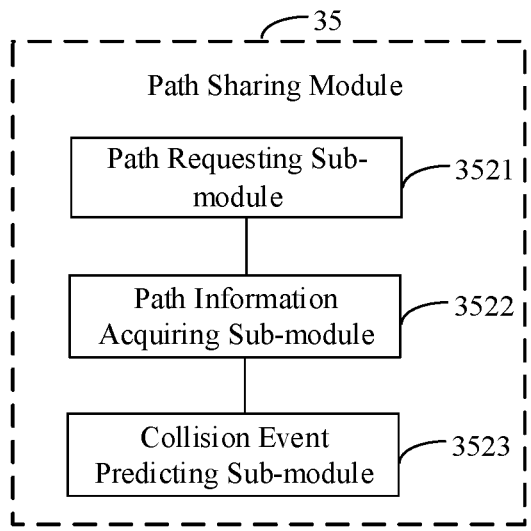
FIG. 17 is a schematic diagram of an application scenario of controlling a UAV to access a network according to another exemplary embodiment of the present disclosure.

Referring to FIG. 17, which illustrates a block diagram of a device for controlling a UAV to access a network according to another exemplary embodiment, based on the device embodiment illustrated in FIG. 15, the path sharing module 35 may include:

a path requesting sub-module 3521, configured to transmit a path request with a terminal identifier of a target UAV control terminal to request a path of a neighboring UAV.

The terminal identifier of the control terminal is a terminal identifier of the UAV control terminal, such as the smartphone A, so that the requested party can determine, after acquiring the flight path information of the neighboring UAV, an address of an information receiver, that is, the destination address, wherein the requested party may be a target UAV control terminal such as the smartphone B, or the target base station.

a path information acquiring sub-module 3522, configured to acquire flight path information of the neighboring UAV; and a collision event predicting sub-module 3523, configured to perform collision event prediction with the flight path information of the primary UAV and the flight path information of the neighboring UAV.

Figure 18:
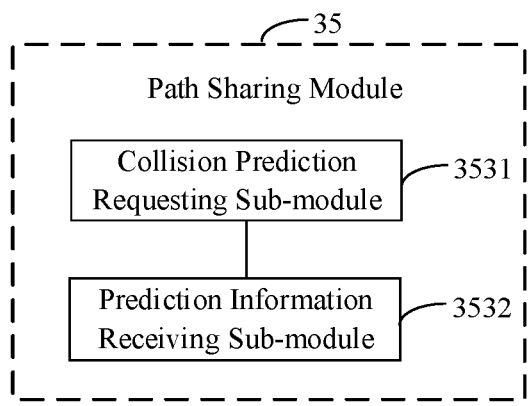
FIG. 18 is a block diagram illustrating a device for controlling a UAV to access a network according to another exemplary embodiment of the present disclosure.

Referring to FIG. 18, which illustrates a block diagram of a device for controlling a UAV to access a network according to another exemplary embodiment, based on the device embodiment illustrated in FIG. 15, the path sharing module 35 may include:

a collision prediction requesting sub-module 3531, configured to transmit, to the target base station, a collision prediction request with a terminal identifier of the target UAV control terminal, so that the target base station, in response to the collision prediction request, performs collision event prediction after acquiring flight path information of the neighboring UAV;

wherein, the collision prediction request includes the terminal identifier of the target UAV control terminal, so that the target base station, in response to the collision prediction request, performs collision event prediction after acquiring the flight path of the neighboring UAV. The collision prediction request may further include: the terminal identifier of the UAV control terminal, so that the target base station determines, according to the terminal identifier of the UAV control terminal, flight path information of the primary UAV of the UAV control terminal. Thus, the target base station may perform the collision event prediction with the flight path information of the primary UAV and the flight path information of the neighboring UAV.

A prediction information receiving sub-module 3532, configured to receive, from the target base station, the collision event prediction information.

Figure 19:
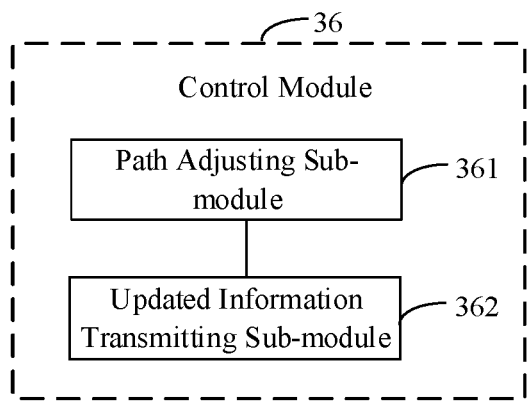
FIG. 19 is a block diagram illustrating a device for controlling a UAV to access a network according to another exemplary embodiment of the present disclosure.

Referring to FIG. 19, which illustrates a block diagram of a device for controlling a UAV to access a network according to another exemplary embodiment, based on the apparatus embodiment illustrated in FIG. 15, the control module 36 may include:

a path updating sub-module 361, configured to update the flight path information of the primary UAV in a case that the collision event prediction information indicates that a collision event probably occurs; and an updated information transmitting sub-module 362, configured to transmit, through the WLAN communication circuit and to the primary UAV, the updated flight path information.

Figure 20:
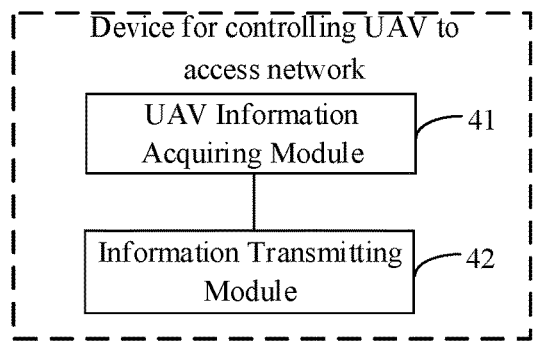
FIG. 20 is a block diagram of a device for controlling a UAV to access a network according to an exemplary embodiment of the present disclosure.

Corresponding to the method of controlling a UAV to access a network implemented on the base station side, the present disclosure further provides a device for controlling a UAV to access a network, which is applicable to the base station. Referring to FIG. 20 which illustrates a block diagram of a device for controlling a UAV to access a network according to an exemplary embodiment, the device may include:

a UAV information acquiring module 41, configured to acquire a UAV identifier through a UAV control terminal which accesses the network, so as to determine an association between the UAV identifier and a terminal identifier of the UAV control terminal; and an information transmitter 42, configured to transmit, to the UAV, information through the UAV control terminal according to the association.

Figure 21:
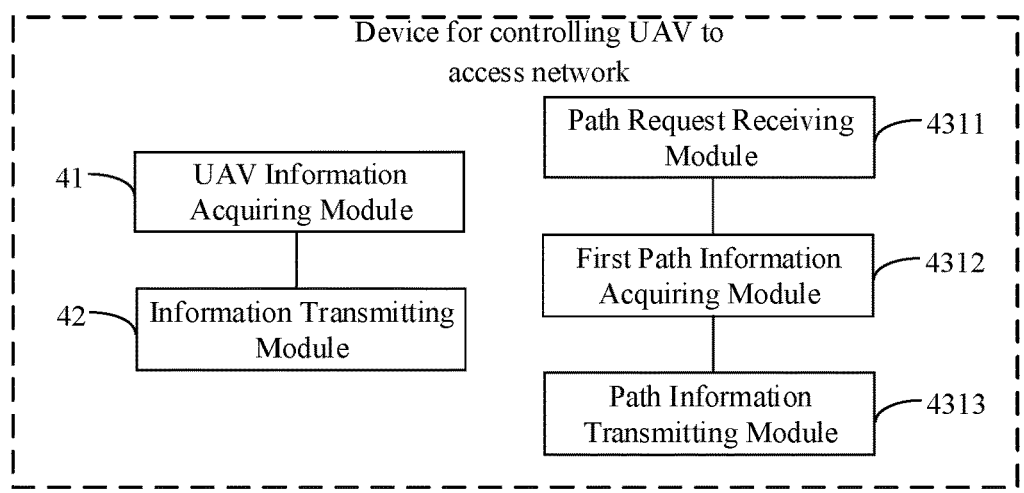
FIG. 21 is a block diagram illustrating a device for controlling a UAV to access a network according to another exemplary embodiment of the present disclosure.

Referring to FIG. 21, which is a block diagram of a device for controlling a UAV to access a network according to another exemplary embodiment, based on the device embodiment illustrated in FIG. 20, the device may further include:

a path request receiver 4311, configured to receive, from the UAV control terminal, a flight path request to request a flight path of a neighboring UAV, the flight path request including a terminal identifier of a target UAV control terminal within a preset distance range from the UAV control terminal, wherein the neighboring UAV is a UAV controlled by the target control terminal;

a first path information acquiring module 4312, configured to acquire flight path information of the neighboring UAV according to the terminal identifier of the target UAV control terminal; and a path information transmitter 4313, configured to transmit, to the UAV control terminal, the flight path information of the neighboring UAV so that the UAV control terminal performs collision event prediction with the flight path information of the neighboring UAV.

Figure 22:
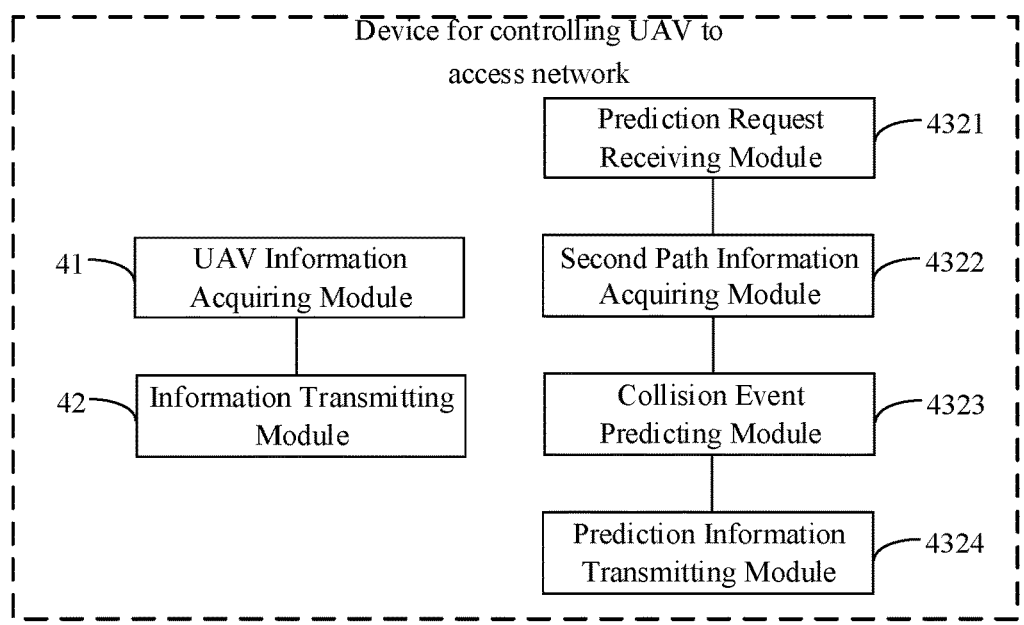
FIG. 22 is a block diagram illustrating a device for controlling of a UAV to access a network according to another exemplary embodiment of the present disclosure.

Referring to FIG. 22, which illustrates a block diagram of a device for controlling a UAV to access a network according to another exemplary embodiment, based on the device embodiment illustrated in FIG. 20, the device may further include:

a prediction request receiver 4321, configured to receive, from the UAV control terminal, a collision prediction request with the terminal identifier of the target UAV control terminal to request the base station to predict a UAV collision event;

a second path information acquiring module 4322, configured to acquire the flight path information of the primary UAV from the UAV control terminal and the flight path information of the neighboring UAV from the target UAV control terminal;

a collision event predicting module 4323, configured to obtain collision event prediction information by performing collision event prediction with the flight path information of the two neighboring UAVs;

wherein, the two neighboring UAVs refer to UAVs respectively controlled by two adjacent UAV control terminals within a preset distance range. In the present disclosure, the two neighboring UAV control terminals are the UAV control terminal and the target UAV control terminal, for example, the smartphone A and the smartphone B in the application scenario as illustrated in FIG. 5. Then, the two neighboring UAVs mentioned above are the UAV U1 and the UAV U2.

A prediction information transmitter 4324, configured to transmit, to the UAV control terminal, the collision event prediction information.

For the device embodiments, since they substantially correspond to the method embodiments, the relevant parts can refer to the part of the description of the method embodiments. The device embodiments described above are merely illustrative. The units described above as separate components may or may not be physically separated, and the components displayed as a unit may or may not be physical units, that is, they may be located at one place or they can be distributed to multiple network units. Some or all of the modules can be selected according to actual requirements to achieve the objectives of the solutions of the present disclosure. One of ordinary skill in the art can understand and implement it without any creative work.

Correspondingly, a UAV control terminal is provided in one aspect, including: a processor; a memory configured to store instructions executable by the processor; wherein the processor is configured to:

acquire, through a first communication circuit, information to be transmitted between the UAV and the target base station;

forward, to a second communication circuit, the information to be transmitted;

transmit, through the second communication circuit, the information to be transmitted to an information receiving end including the UAV or a target base station of a mobile communication network;

wherein the first communication circuit and the second communication circuit are of different types including a cellular communication circuit and a WLAN communication circuit.

In another aspect, a base station is provided, including: a processor; a memory configured to store instructions executable by the processor; wherein the processor is configured to:

acquire a UAV identifier through a UAV control terminal which accesses the network, and determine an association between the UAV identifier and a terminal identifier of the UAV control terminal; and transmit information to the UAV via the UAV control terminal according to the association.

Figure 23:
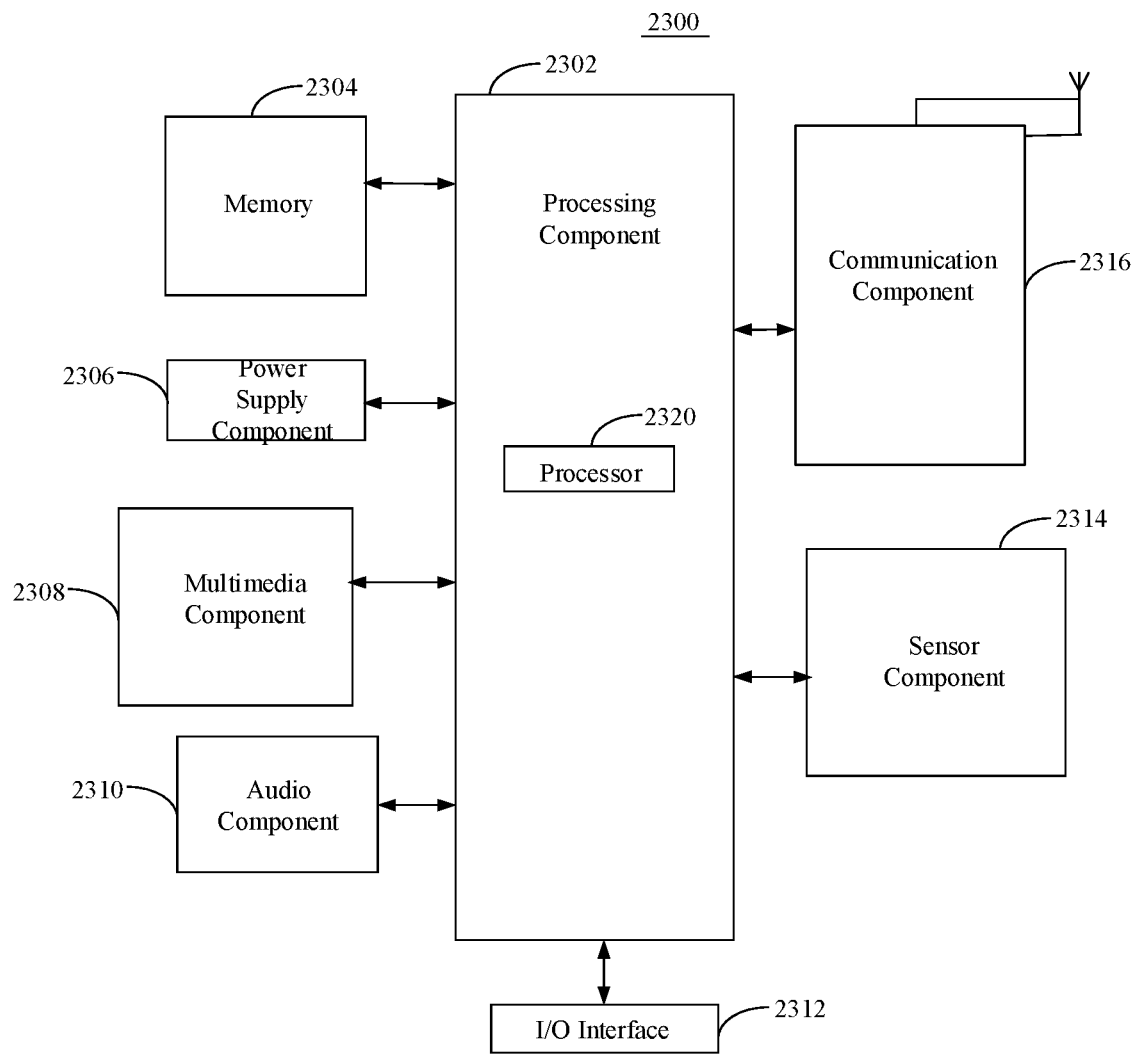
FIG. 23 is a schematic structural diagram of a UAV control terminal according to an exemplary embodiment of the present disclosure.

FIG. 23 illustrates a schematic structural diagram of a UAV control terminal 2300 according to an exemplary embodiment. For example, the UAV control terminal 2300 may be a terminal of a 5G network, and may be a mobile phone, a computer, a digital broadcasting terminal, a messaging device, a game console, a tablet device, a medical device, a fitness device, a personal digital assistant, a wearable device such as a smart watch, a smart glasses, a smart bracelet, smart running shoes, and etc.

Referring to FIG. 23, the UAV control terminal 2300 may include one or more of the following components: a processing component 2302, a memory 2304, a power supply component 2306, a multimedia component 2308, an audio component 2310, an input/output (I/O) interface 2312, a sensor component 2314, and a communication component 2316.

The processing component 2302 typically controls overall operations of the UAV control terminal 2300, such as operations associated with display, telephone call, data communication, camera operation, and recording operation. The processing component 2302 may include one or more processors 2320 to execute instructions so as to complete all or part of the steps of the foregoing method. In addition, the processing component 2302 may include one or more modules to facilitate interaction between the processing component 2302 and other components. For example, the processing component 2302 may include a multimedia module to facilitate interaction between the multimedia component 2308 and the processing component 2302.

The memory 2304 is configured to store various types of data to support the operation of the UAV control terminal 2300. Examples of such data include instructions for any application or method operated on the UAV control terminal 2300, contact data, phone book data, messages, pictures, videos, and the like. The memory 2304 can be implemented by any type of volatile or non-volatile storage device or their combination, such as static a random access memory (SRAM), an electrically erasable programmable read-only memory (EEPROM), an erasable Programmable read-only memory (EPROM), programmable read-only memory (PROM), a read-only memory (ROM), a magnetic memory, a flash memory, a magnetic disk or an optical disk.

The power supply component 2306 provides power to various components of the UAV control terminal 2300. The power supply component 2306 may include a power management system, one or more power supplies, and other components associated with generating, managing, and distributing power for the UAV control terminal 2300.

The multimedia component 2308 includes a screen providing an output interface between the aforementioned UAV control terminal 2300 and the user. In some embodiments of the present disclosure, the screen may include a liquid crystal display (LCD) and a touch panel (TP). In a case that the screen includes a touch panel, the screen may be implemented as a touch screen to receive an input signal from the user. The touch panel includes one or more touch sensors to sense touch, sliding, and gestures on the touch panel. The above-mentioned touch sensor may not only sense the boundary of the touch or the sliding, but also detect duration and pressure related to the above-mentioned touch or sliding operation. In some embodiments of the present disclosure, the multimedia component 2308 includes a front camera and/or a rear camera. In a case that the UAV control terminal 2300 is in an operation mode, such as a shooting mode or a video mode, the front camera and/or the rear camera can receive external light to generate multimedia data. Each front camera and rear camera can be a fixed optical lens system or an optical lens system have optical zooming capabilities.

The audio component 2310 is configured to output and/or input audio signals. For example, the audio component 2310 includes a microphone (MIC), and in a case that the UAV control terminal 2300 is in an operation mode, such as a call mode, a recording mode, and a voice recognition mode, the microphone, configured to receive external audio signals. The received audio signal may be further sampled and digitized so as to be stored in the memory 2304 for further processing or transmitted via the communication component 2316. In some embodiments, the audio component 2310 further includes a speaker for outputting audio signals.

The I/O interface 2312 provides an interface between the processing component 2302 and a peripheral interface module. The peripheral interface module may be a keyboard, a click wheel, a button, and the like. These buttons may include but are not limited to: a home button, a volume button, a start button, and a lock button.

The sensor component 2314 includes one or more sensors to provide the UAV control terminal 2300 with state evaluation for various aspects. For example, the sensor component 2314 can detect the ON/OFF state of the UAV control terminal 2300 and relative positioning of the components. For example, the above components are the display and the keypad of the UAV control terminal 2300. The sensor component 2314 can also detect the position change of the UAV control terminal 2300 or a component of the UAV control terminal 2300. The presence or absence of contact between the user and the UAV control terminal 2300, the orientation or acceleration/deceleration of the UAV control terminal 2300, and the temperature change of the UAV control terminal 2300. The sensor assembly 2314 may include a proximity sensor to detect the presence of nearby objects when there is no physical contact. The sensor component 2314 may further include a light sensor, such as a CMOS or CCD image sensor, for imaging applications. In some embodiments, the sensor component 2314 may further include an acceleration sensor, a gyroscope sensor, a magnetic sensor, a pressure sensor or a temperature sensor.

The communication component 2316 is configured to facilitate wired or wireless communication between the UAV control terminal 2300 and other devices. The UAV control terminal 2300 can access a wireless network based on a communication standard, such as WiFi, 2G, 3G, 4G, or 5G, or a combination thereof. In an exemplary embodiment, the communication component 2316 receives a broadcast signal or broadcast related information from an external broadcast management system via a broadcast channel. In an exemplary embodiment, the communication component 2316 further includes a near field communication (NFC) module to facilitate short-range communication. For example, the NFC module can be implemented based on radio frequency identification (RFID) technology.

In an exemplary embodiment, the UAV control terminal 2300 may be implemented by one or more application specific integrated circuit (ASIC), digital signal processor (DSP), digital signal processing device (DSPD), programmable logic device (PLD), field programmable gate array (FPGA), controller, microcontroller, microprocessor, or other electronic component, and configured to perform the above methods.

In an exemplary embodiment, there is further provided a non-transitory computer-readable storage medium having instructions stored thereon, such as a memory 2304 having instructions stored thereon, which may be executed by the processor 2320 of the UAV control terminal 2300 to complete any of the methods of controlling a UAV to access a network as illustrated in FIGS. 1-9. For example, the non-transitory computer-readable storage medium may be a ROM, a random access memory (RAM), a CD-ROM, a magnetic tape, a floppy disk, an optical data storage device, and etc.

Figure 24:
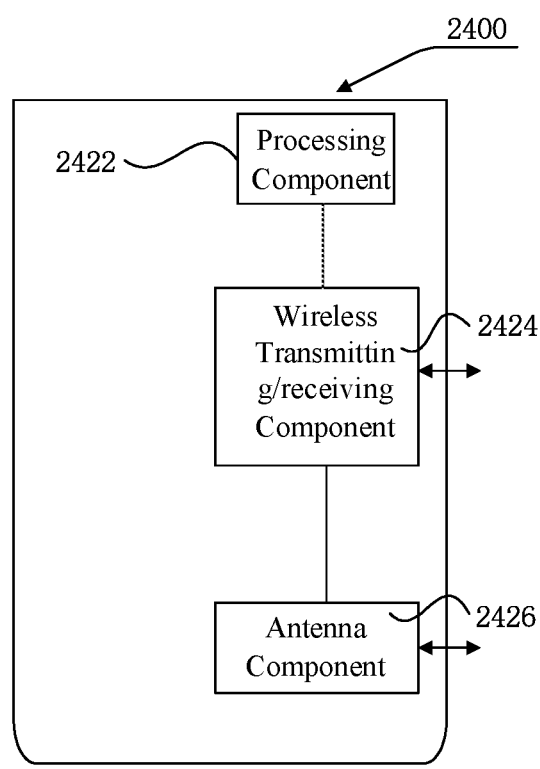
FIG. 24 is a schematic structural diagram of a base station according to an exemplary embodiment of the present disclosure.

As illustrated in FIG. 24, FIG. 24 is a schematic structural diagram of a base station 2400 according to an exemplary embodiment. The base station can be applicable to 2G, 3G, 4G or 5G networks, as well as a combination thereof. Referring to FIG. 24, the base station 2400 includes a processing component 2422, a wireless transmitting/receiving component 2424, an antenna component 2426, and a signal processing part specific to a wireless interface. The processing component 2422 may further include one or more processors.

One of the processors in the processing component 2422 may be configured to:
    acquire, through a UAV control terminal connected to the network, a UAV identifier, and determine an association between the UAV identifier and a terminal identifier of a UAV control terminal; and
    transmit, through the UAV control terminal, information to the UAV according to the association.

In an exemplary embodiment, there is further provided a non-transitory computer-readable storage medium having computer instructions stored thereon. The computer instructions can be executed by the processing component 2422 of the base station 2400 to complete any method of controlling a UAV to access a network as illustrated in FIGS. 10-12. For example, the non-transitory computer-readable storage medium may be a ROM, a random access memory (RAM), a CD-ROM, a magnetic tape, a floppy disk, and optical data storage device, and etc.

The technical solutions according to the embodiments of the present disclosure can produce the following beneficial effects.

Through the UAV control terminal provided with the cellular communication circuit, the method of controlling the UAV to access the mobile communication network according to the present disclosure can achieve the access of the UAV to the mobile communication network and information transmission between the UAV and the UAV control terminal, without providing the UAV with a cellular communication circuit. And the information is forwarded through the WLAN communication circuit, which makes up the insufficient air coverage of the mobile cellular network signal.

After considering the specification and practicing the disclosure disclosed herein, one of ordinary skill in the art will easily think of other embodiments of the present disclosure. This application is intended to cover any variations, uses, or adaptive modifications of the present disclosure, which follow the general principles of the present disclosure and include common knowledge or conventional technical means in the technical field not disclosed in the present disclosure. The description and the embodiments are illustrative only, and the true scope and spirit of the present disclosure are set forth by the appended claims.

It should be understood that the present disclosure is not limited to the exact structure that has been described above and illustrated in the drawings, and various modifications and changes can be made without departing from its scope. The scope of the present disclosure is limited only by the appended claims.

The invention claimed is:

1. A method of controlling an unmanned aerial vehicle (UAV) to access a network, applicable to a UAV control terminal, and comprising:
   accessing, through a cellular communication circuit, a mobile communication network covered by a target base station;
   transmitting, to the target base station, a UAV identifier of a primary UAV being controlled by the UAV control terminal, so that the target base station acquires an association between a terminal identifier of the UAV control terminal and the UAV identifier;
   transmitting, through a wireless local area network (WLAN) communication circuit and to the primary UAV, a base station identifier of the target base station;
   acquiring, through a first communication circuit, information to be transmitted between the primary UAV and the mobile communication network;
   forwarding, to a second communication circuit, the information to be transmitted; and
   transmitting, through the second communication circuit, the information to be transmitted to an information receiving end comprising the primary UAV or a target base station of the mobile communication network;
   wherein the first communication circuit and the second communication circuit are of different types comprising the cellular communication circuit and the WLAN communication circuit.

2. The method according to claim 1, further comprising:
   detecting a target UAV control terminal which controls a neighboring UAV within a preset distance range;
   acquiring collision event prediction information on collision between the primary UAV and the neighboring UAV through sharing flight path information with the target UAV control terminal; and
   controlling the primary UAV according to the collision event prediction information.

3. The method according to claim 2, wherein sharing flight path information of the primary UAV with the target UAV control terminal is achieved through any one of the following:
   using direct communication via the WLAN communication circuit; and
   using the target base station via the cellular communication circuit.

4. The method according to claim 2, wherein
   acquiring the collision event prediction information on collision between the primary UAV and the neighboring UAV through sharing flight path information with the target UAV control terminal comprises:
   transmitting, to the target UAV control terminal, flight path information of the primary UAV so that the target UAV control terminal determines the collision event prediction information; and
   acquiring the collision event prediction information determined by the target UAV control terminal.

5. The method according to claim 2, wherein acquiring the collision event prediction information on collision between the primary UAV and the neighboring UAV through sharing flight path information with the target UAV control terminal comprises:
   transmitting a path request with a terminal identifier of the target UAV control terminal to request flight path information of a neighboring UAV;
   acquiring flight path information of the neighboring UAV; and
   predicting the collision event according to the flight path information of the primary UAV and the flight path information of the neighboring UAV.

6. The method according to claim 2, wherein acquiring the collision event prediction information on collision between the primary UAV and the neighboring UAV through sharing flight path information with the target UAV control terminal comprises:
   transmitting, to the target base station, a collision prediction request with a terminal identifier of the target UAV control terminal to request the target base station to predict the collision event prediction information after acquiring a flight path of a neighboring UAV; and
   receiving, from the target base station, the collision event prediction information.

7. The method according to claim 2, wherein controlling the primary UAV according to the collision event prediction information comprises:
   updating, in response to determining that the collision event prediction information indicates that a collision event probably occurs, the flight path information of the primary UAV; and
   transmitting, through the WLAN communication circuit and to the primary UAV, the updated flight path information.

8. A method of controlling an unmanned aerial vehicle (UAV) to access to a network, applicable to a base station, and comprising:
   obtaining a UAV identifier of a primary UAV through a UAV control terminal which accesses a mobile communication network covered by the base station, wherein the primary UAV is controlled by the UAV control terminal, and
   determining an association between the UAV identifier and a terminal identifier of the UAV control terminal; and
   transmitting first information to the primary UAV through the UAV control terminal and acquiring second information on the primary UAV through the UAV control terminal according to the association, wherein a base station identifier of the target base station is transmitted to the primary UAV through the UAV control terminal.

9. The method according to claim 8, further comprising:
   receiving, from the UAV control terminal, a flight path request to request flight path information of a neighboring UAV, wherein the flight path request comprises a terminal identifier of a target UAV control terminal within a preset distance range from the UAV control terminal;

acquiring flight path information of the neighboring UAV according to the terminal identifier of the target UAV control terminal; and transmitting, to the UAV control terminal, the flight path information of the neighboring UAV so that the UAV control terminal performs collision event prediction with the flight path information of the neighboring UAV.

10. The method according to claim 8, further comprising:

receiving, from the UAV control terminal, a collision prediction request with a terminal identifier of the target UAV control terminal to request the base station to predict UAV collision event;

acquiring flight path information of a primary UAV from the UAV control terminal and flight path information of a neighboring UAV from the target UAV control terminal;

obtaining collision event prediction information by performing collision event prediction with the flight path information of the primary UAV and the flight path information of the neighboring UAV; and transmitting, to the UAV control terminal, the collision event prediction information.

11. A UAV control terminal, comprising:

a processor; and a memory, configured to store instructions executable by the processor;

wherein, the processor is configured to:

access, through a cellular communication circuit, a mobile communication network covered by a target base station;

transmit, to the target base station, a UAV identifier of a primary UAV being controlled by the UAV control terminal, so that the target base station acquires an association between a terminal identifier of the UAV control terminal and the UAV identifier;

transmit, through a wireless local area network (WLAN) communication circuit and to the primary UAV, a base station identifier of the target base station;

acquire, through a first communication circuit, information to be transmitted between the primary UAV and the mobile communication network;

forward, to a second communication circuit, the information to be transmitted; and transmit, through the second communication circuit, the information to be transmitted to an information receiving end comprising the primary UAV or a target base station of the mobile communication network;

wherein the first communication circuit and the second communication circuit are of different types comprising the cellular communication circuit and the WLAN communication circuit.

12. A base station, comprising:

a processor; and a memory, configured to store instructions executable by the processor;

wherein, the processor is configured to:

obtain a UAV identifier of a primary UAV through a UAV control terminal which accesses a mobile communication network covered by the base station, wherein the primary UAV is controlled by the UAV control terminal, and determine an association between the UAV identifier and a terminal identifier of the UAV control terminal; and transmit first information to the primary UAV through the UAV control terminal and acquire second information on the primary UAV through the UAV control terminal according to the association, wherein a base station identifier of the target base station is transmitted to the primary UAV through the UAV control terminal.

13. The UAV control terminal according to claim 11, wherein the processor is further configured to:

detect a target UAV control terminal which controls a neighboring UAV within a preset distance range;

acquire collision event prediction information on collision between the primary UAV and the neighboring UAV through sharing flight path information with the target UAV control terminal; and control the primary UAV according to the collision event prediction information.

14. The UAV control terminal according to claim 13, wherein sharing flight path information with the target UAV control terminal is achieved through any one of the following:

using direct communication via the WLAN communication circuit; and using the target base station via the cellular communication circuit.

15. The UAV control terminal according to claim 13, wherein the processor is further configured to:

transmit, to the target UAV control terminal, flight path information of the primary UAV so that the target UAV control terminal determines the collision event prediction information; and acquire the collision event prediction information determined by the target UAV control terminal.

16. The UAV control terminal according to claim 13, wherein the processor is further configured to:

transmit a path request with a terminal identifier of the target UAV control terminal to request flight path information of a neighboring UAV;

acquire flight path information of the neighboring UAV; and acquire the collision event prediction information by predicting collision event with the flight path information of the primary UAV and the flight path information of the neighboring UAV.

17. The UAV control terminal according to claim 13, wherein the processor is further configured to:

transmit, to the target base station, a collision prediction request with a terminal identifier of the target UAV control terminal so that the target base station, in response to the collision prediction request, performs collision event prediction after acquiring a flight path of a neighboring UAV; and receive, from the target base station, the collision event prediction information.

18. The UAV control terminal according to claim 13, wherein the processor is further configured to:

update, in response to determining that the collision event prediction information indicates that a collision event probably occurs, the flight path information of the primary UAV; and transmit, through the WLAN communication circuit and to the primary UAV, the updated flight path information.

* * * * *